United States Patent
Sharma et al.

(10) Patent No.: US 9,448,694 B2
(45) Date of Patent: Sep. 20, 2016

(54) GRAPHICAL USER INTERFACE FOR NAVIGATING APPLICATIONS

(71) Applicant: INTEL CORPORATION, Santa Clara, CA (US)

(72) Inventors: Sameer Sharma, Santa Clara, CA (US); Douglas Satzger, Menlo Park, CA (US); Gadi Amit, San Mateo, CA (US); Yoshikazu Hoshino, San Francisco, CA (US); Nicolas Stauber, San Francisco, CA (US); Solene Bourgeois, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 13/886,115

(22) Filed: May 2, 2013

(65) Prior Publication Data

US 2014/0137020 A1    May 15, 2014

Related U.S. Application Data

(60) Provisional application No. 61/724,820, filed on Nov. 9, 2012, provisional application No. 61/724,817, filed on Nov. 9, 2012.

(51) Int. Cl.
*G06F 3/0482*    (2013.01)
*G06F 3/0486*    (2013.01)

(52) U.S. Cl.
CPC .......... *G06F 3/0482* (2013.01); *G06F 3/0486* (2013.01)

(58) Field of Classification Search
CPC .............. G06F 3/0482; G06F 3/0486; G06F 2203/04802
USPC .................. 715/769, 810, 828; 345/352, 353
See application file for complete search history.

(56) References Cited

U.S. PATENT DOCUMENTS

| | | | |
|---|---|---|---|
| 6,411,337 B2* | 6/2002 | Cove et al. | 348/563 |
| 6,501,464 B1 | 12/2002 | Cobbley et al. | |
| 7,091,998 B2* | 8/2006 | Miller-Smith | 715/810 |
| 8,028,250 B2* | 9/2011 | Vronay | G06F 3/0482 715/764 |
| 8,108,776 B2 | 1/2012 | Gopalakrishnan | |
| 2004/0100479 A1* | 5/2004 | Nakano et al. | 345/700 |

(Continued)

OTHER PUBLICATIONS

Android Design, Patterns, Action Bar ("Android"), retrieved via Internet Archive dated May 4, 2012.*
"Find out how," retrieved on Apr. 24, 2013 at http://www.apple.com/findouthow/mac/#switchapps, 1 page.
Olivier Chapuis and Nicolas Roussel, "Copy-and-Paste Between Overlapping Windows," [Online], Apr. 2007, pp. 1-10, [Retrieved from Internet on Apr. 2, 2013], <http://hal.inria.fr/docs/00/53/35/93/PDF/CHI07-CopyPaste-av.pdf>.

(Continued)

*Primary Examiner* — Doon Chow
*Assistant Examiner* — James T Tsai
(74) *Attorney, Agent, or Firm* — Patent Capital Group

(57) ABSTRACT

Technologies are provided in embodiments to provide a graphical user interface to navigate applications on a mobile device. At least one embodiment is configured to receive a request to display a rotatable menu of applications on a computing device and to generate the rotatable menu comprising a first set of one or more content cards, where at least one of the content cards of the first set represents at least one application in the computing device. The embodiment is also configured to provide the rotatable menu in a first orientation for display on the computing device. Embodiments may be configured to receive an indication of input to rotate the rotatable menu, rotate the rotatable menu to a second orientation, and cause, at least in part, actions that result in display of the rotatable menu in the second orientation.

19 Claims, 32 Drawing Sheets

(56) References Cited

U.S. PATENT DOCUMENTS

| | | | |
|---|---|---|---|
| 2007/0271528 A1* | 11/2007 | Park | G06F 3/0482 |
| | | | 715/810 |
| 2007/0300187 A1* | 12/2007 | Hama et al. | 715/830 |
| 2009/0228820 A1* | 9/2009 | Kim et al. | 715/769 |
| 2010/0023858 A1* | 1/2010 | Ryu et al. | 715/702 |
| 2010/0093400 A1* | 4/2010 | Ju et al. | 455/566 |
| 2010/0211872 A1* | 8/2010 | Rolston et al. | 715/702 |
| 2010/0306703 A1* | 12/2010 | Bourganel et al. | 715/823 |
| 2012/0218303 A1* | 8/2012 | Nakada | G02B 27/017 |
| | | | 345/649 |
| 2013/0019182 A1* | 1/2013 | Gil et al. | 715/738 |
| 2013/0212529 A1* | 8/2013 | Amarnath | 715/810 |

OTHER PUBLICATIONS

"iPhone User Guide for iOS 6.1 Software," [Online], copyright 2013, pp. 1-156, [Retrieved from Internet on Apr. 24, 2013], <http://manuals.info.apple.com/en/iphone_user_guide.pdf>.

"Kindle Fire User's Guide," [Online], copyright 2004-2011, pp. 1-24, [Retrieved from Internet on Apr. 24, 2013], <http://kindle-fire-updates.s3.amazonaws.com/Kindle_Fire_User_Guide.pdf>.

"iPat in My Studio, Quick Switching Between iPad Apps," retrieved on Apr. 24, 2013 at http://inmystudio.com/blog/switching-between-ipad-apps/, pp. 1-4.

* cited by examiner

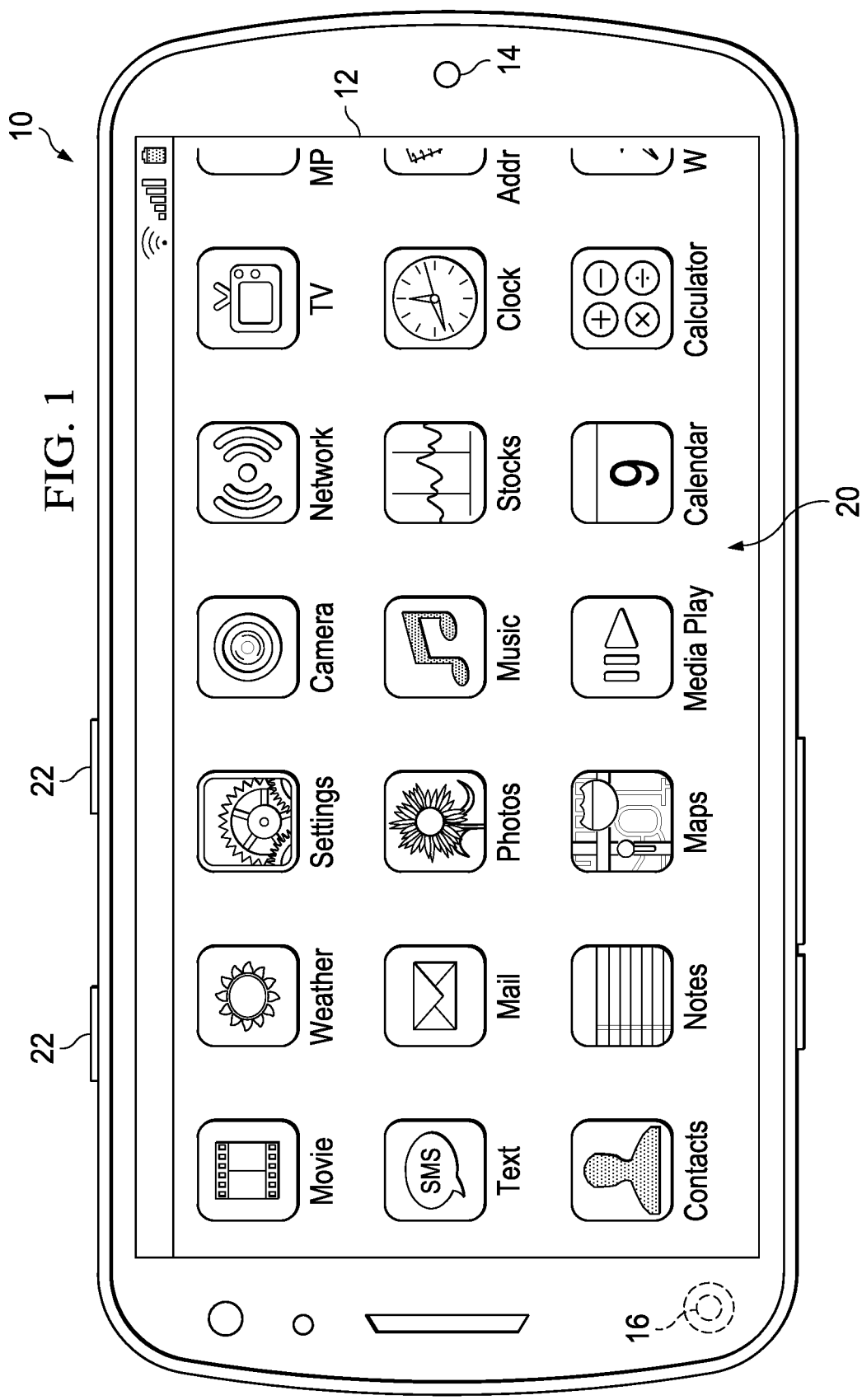

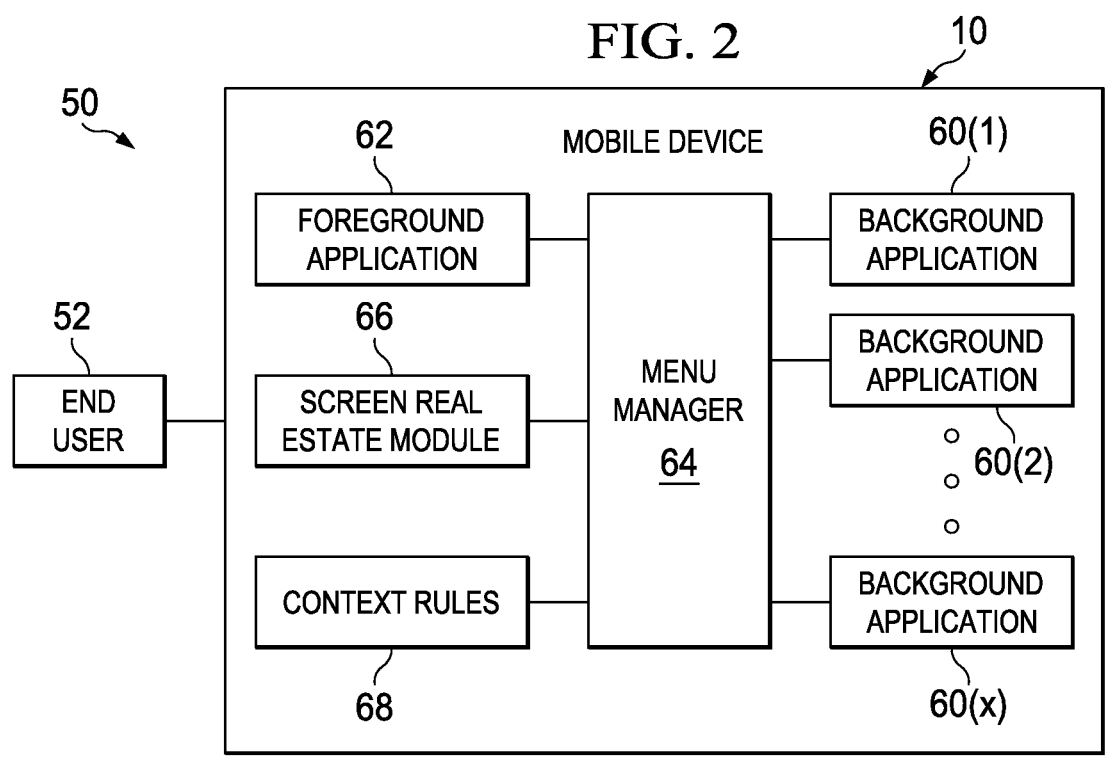

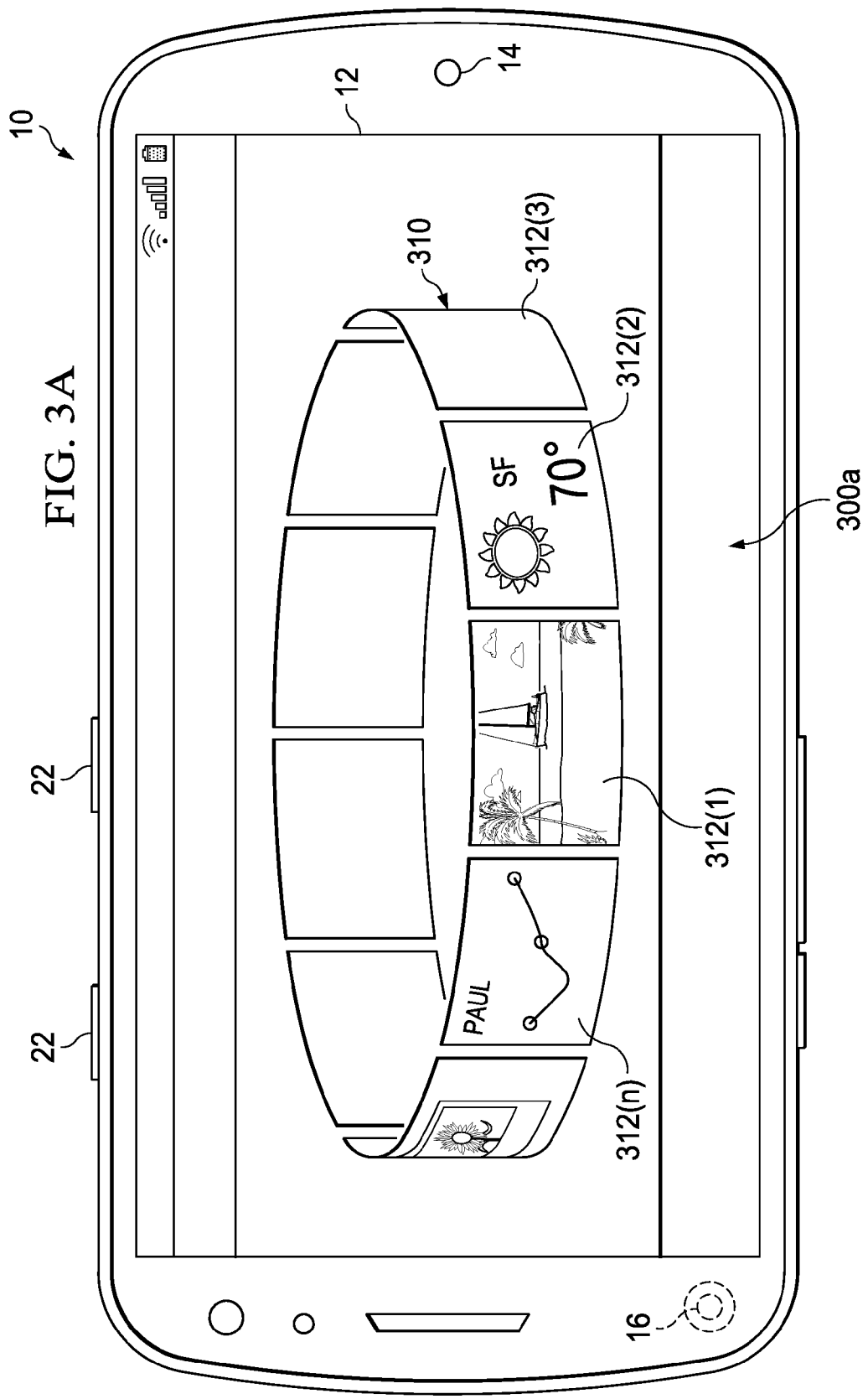

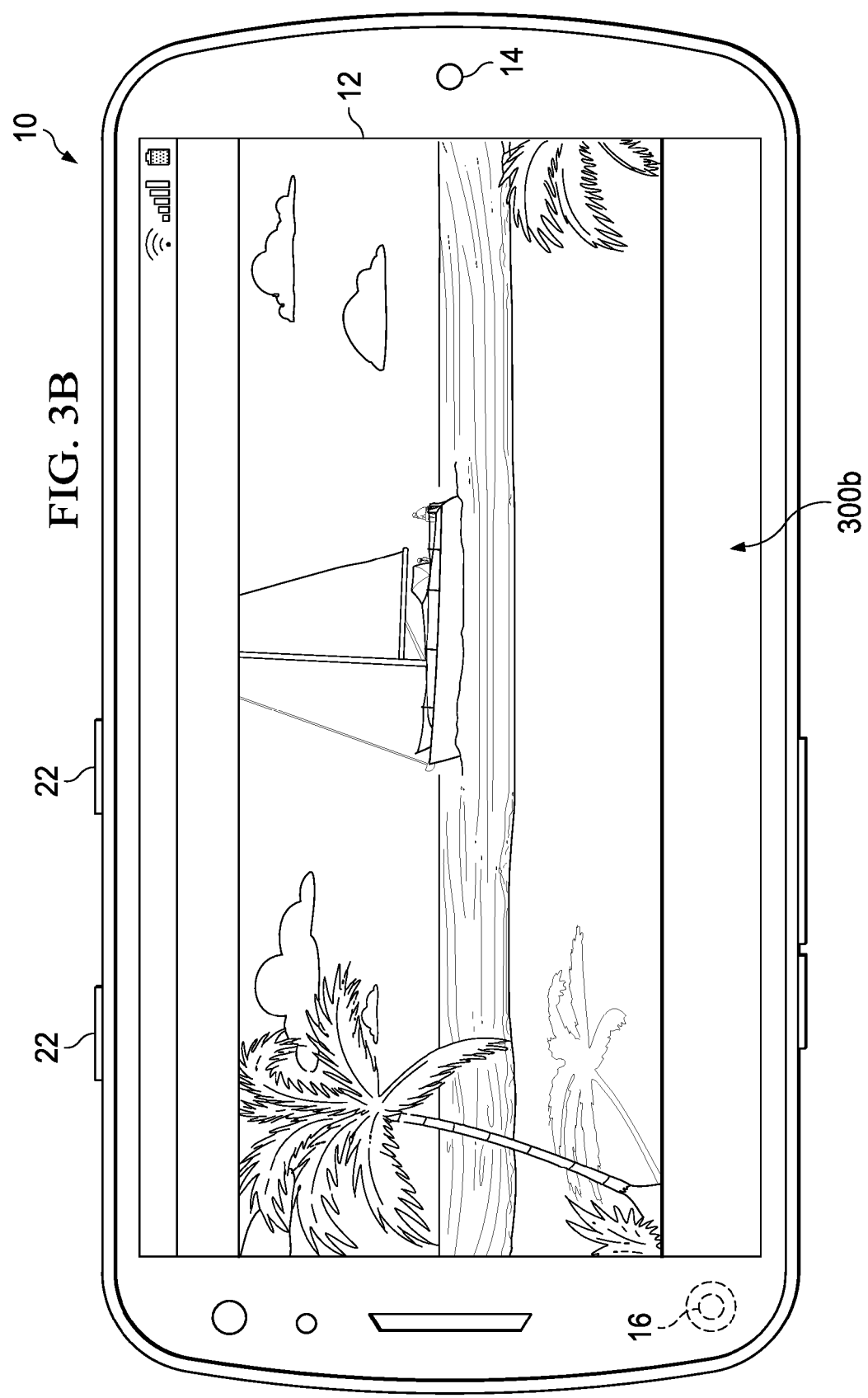

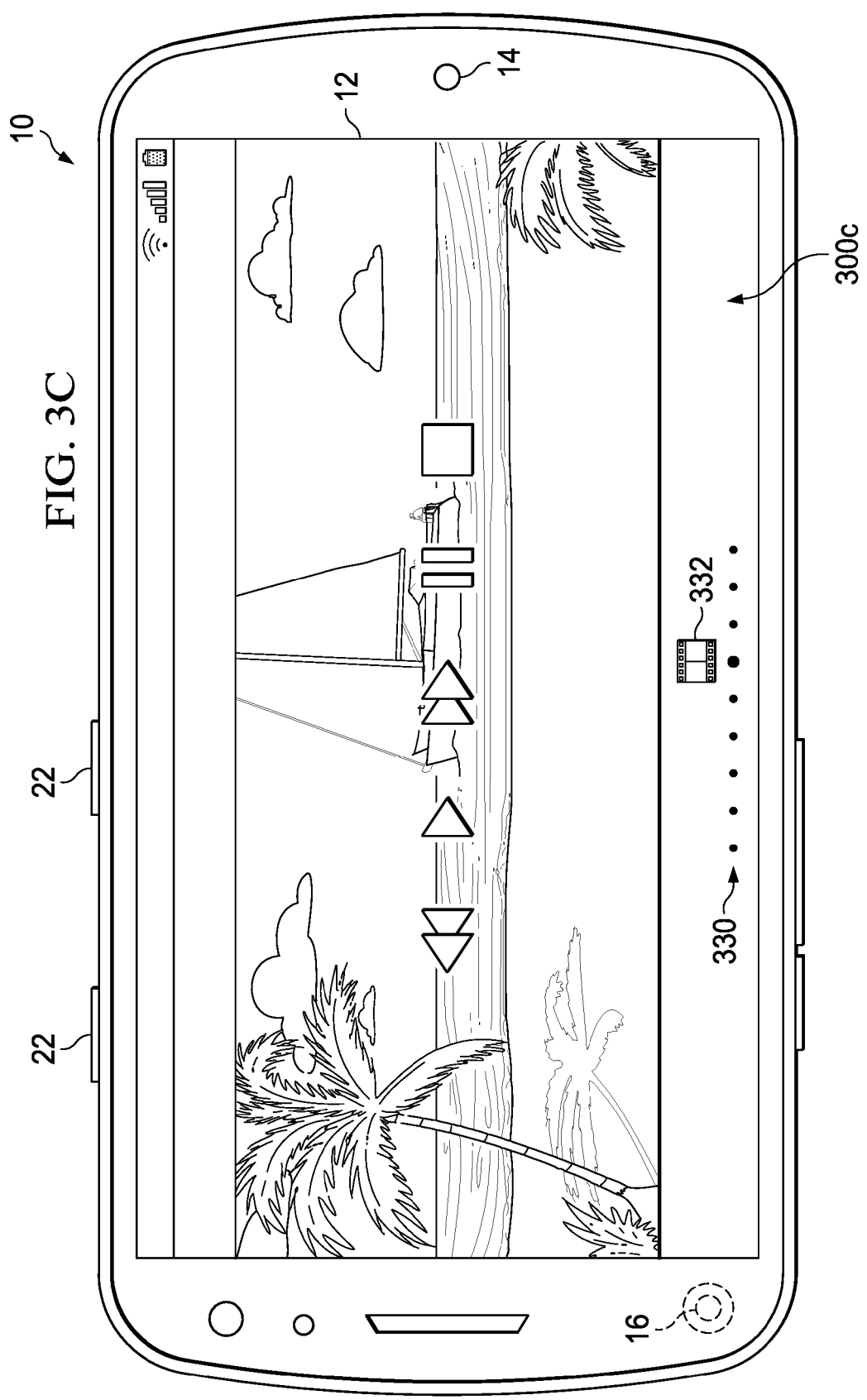

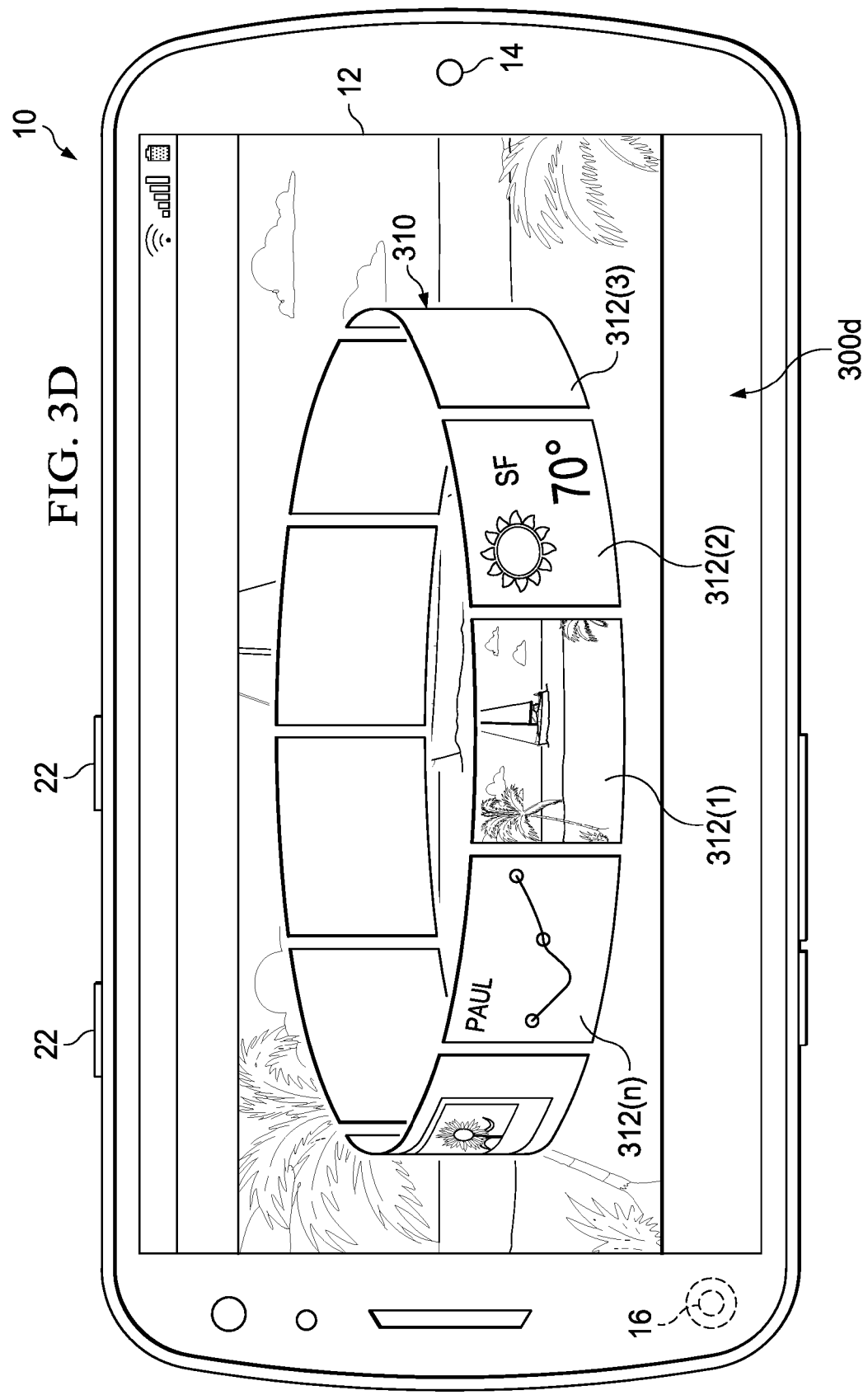

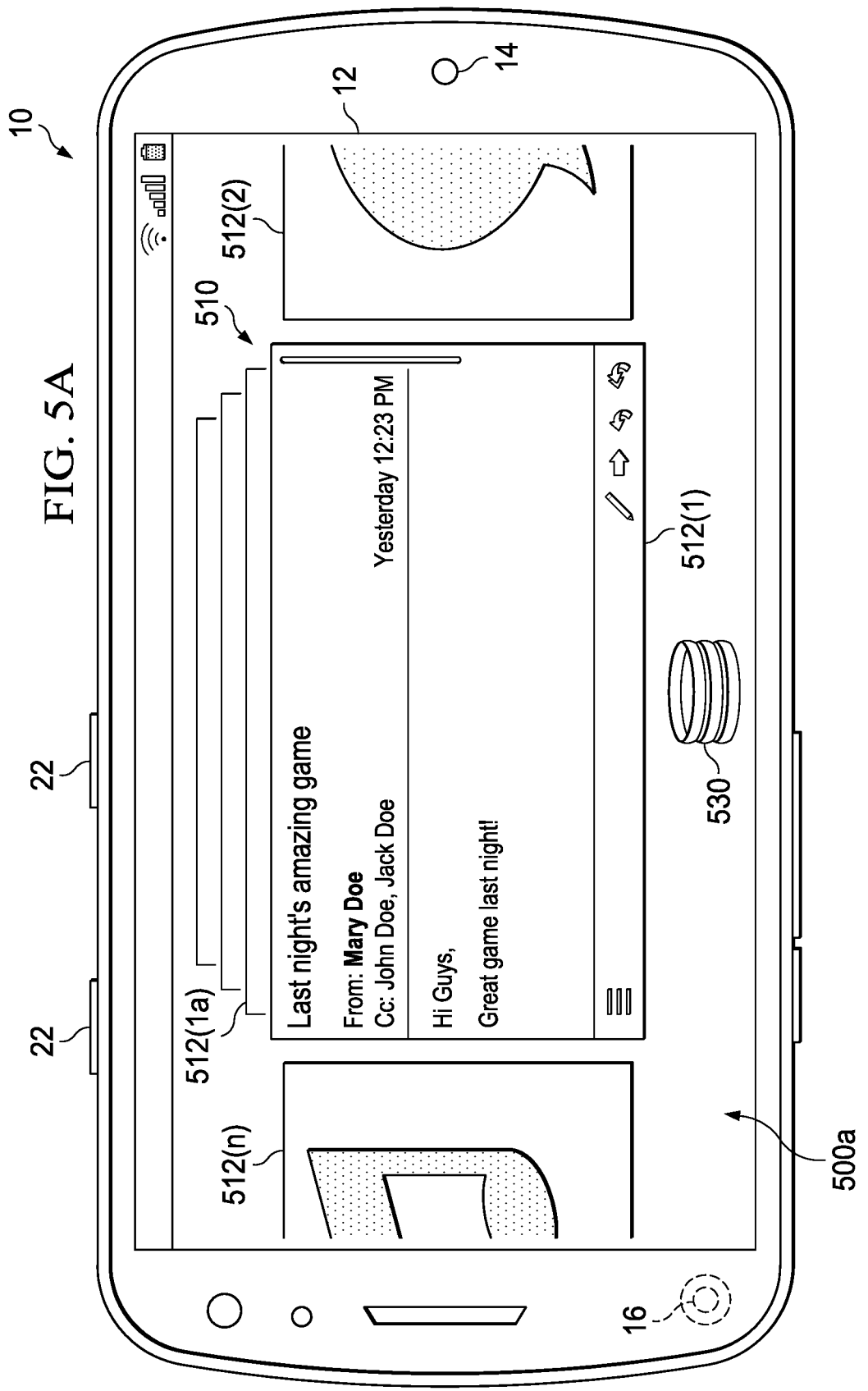

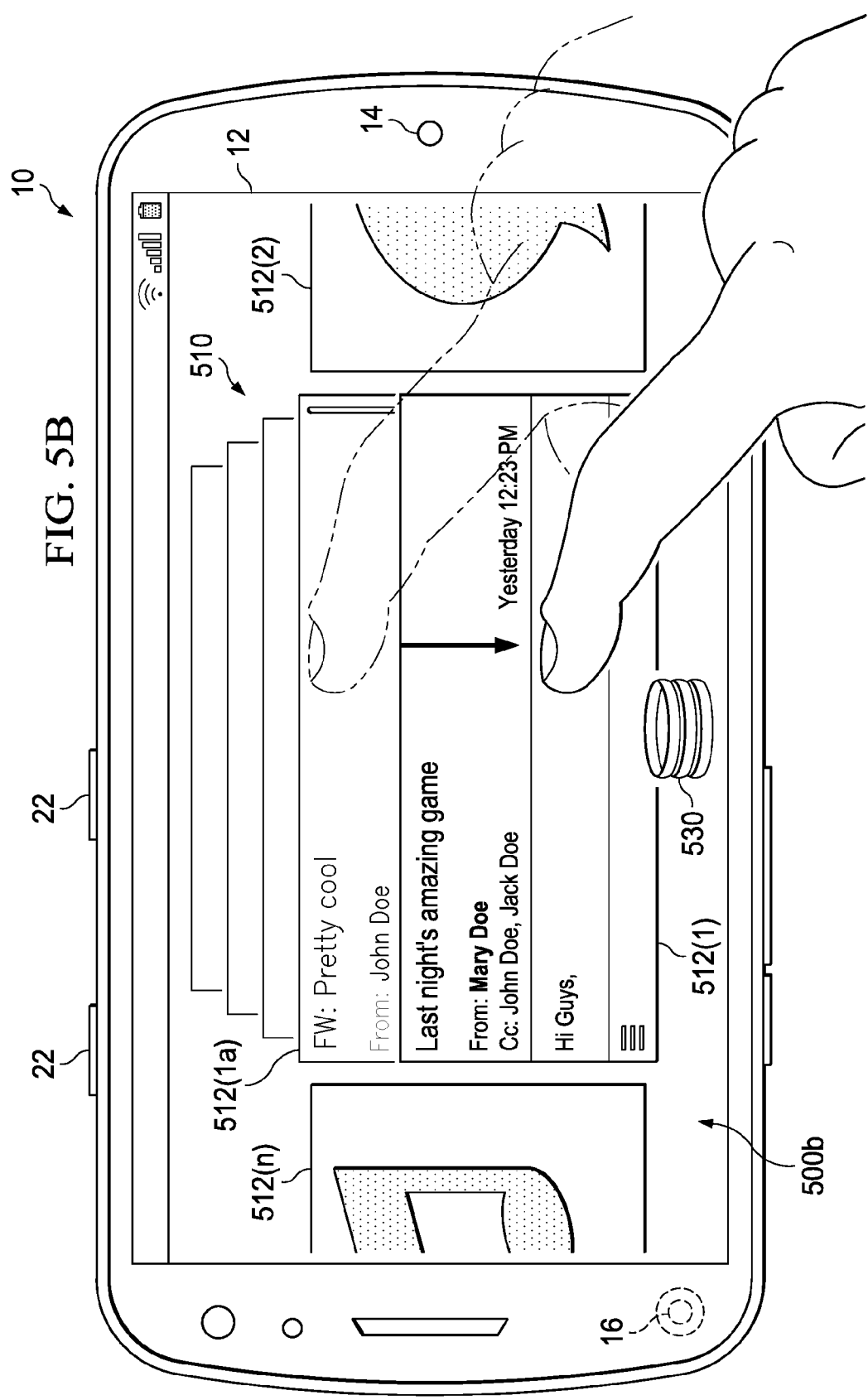

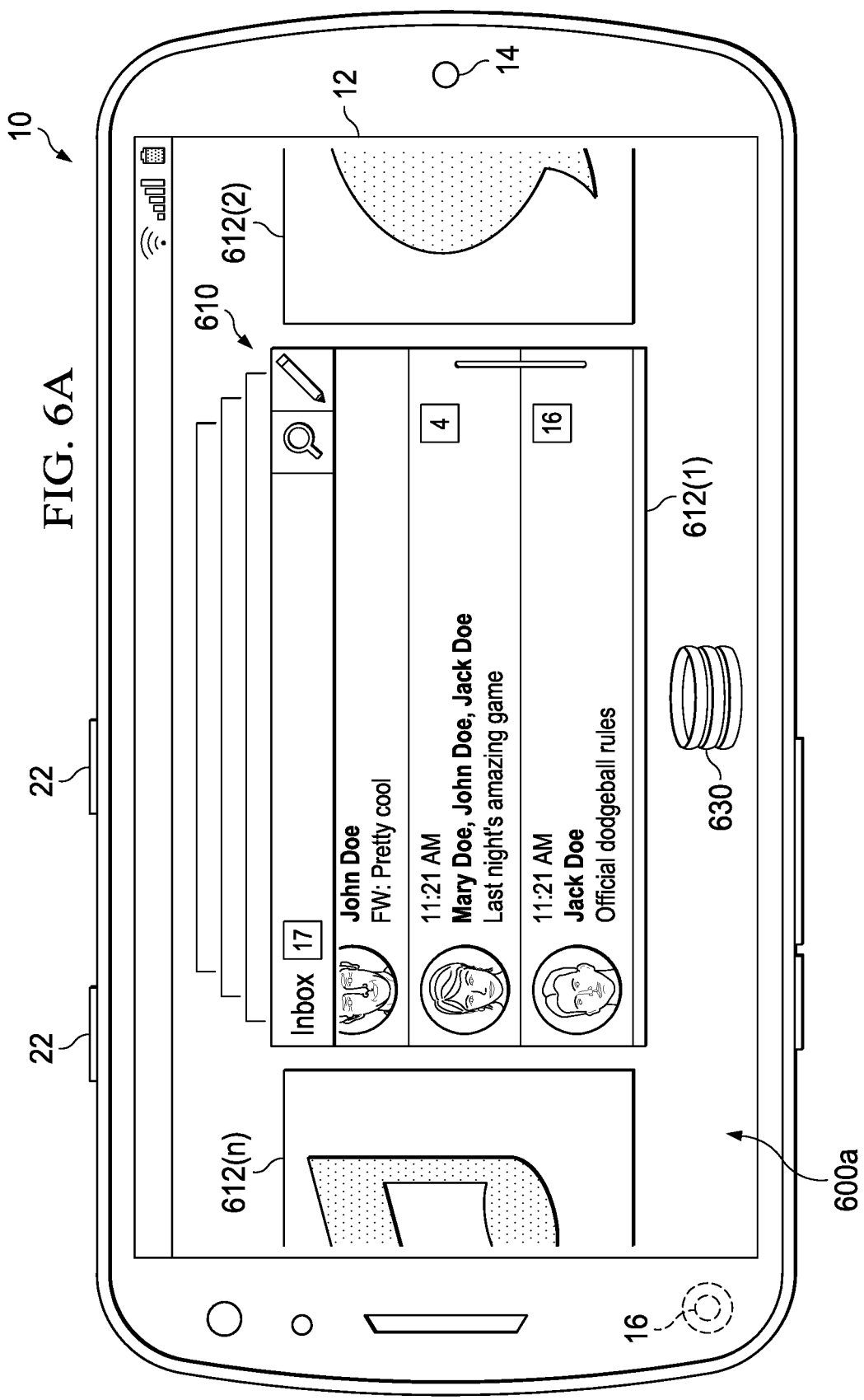

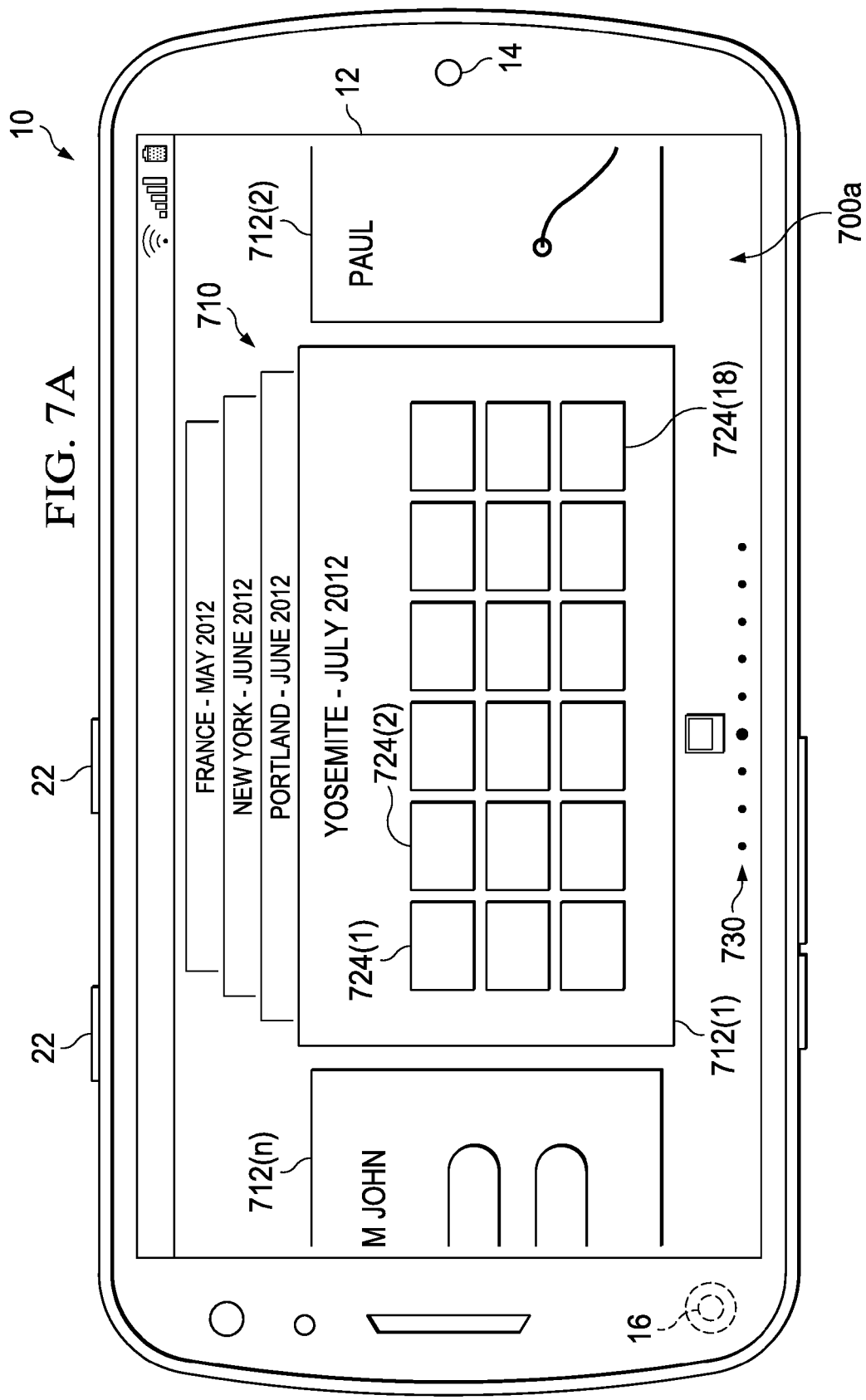

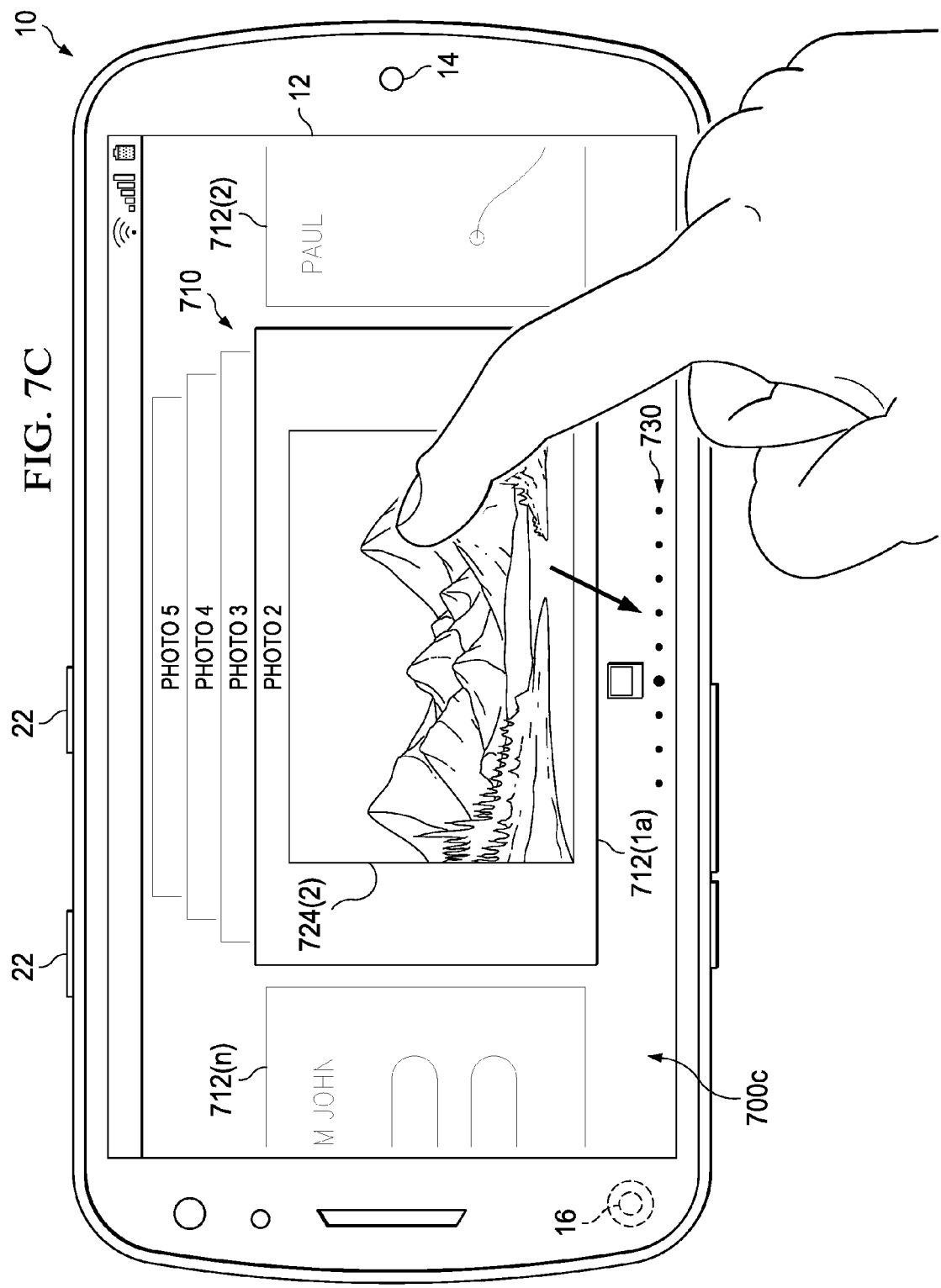

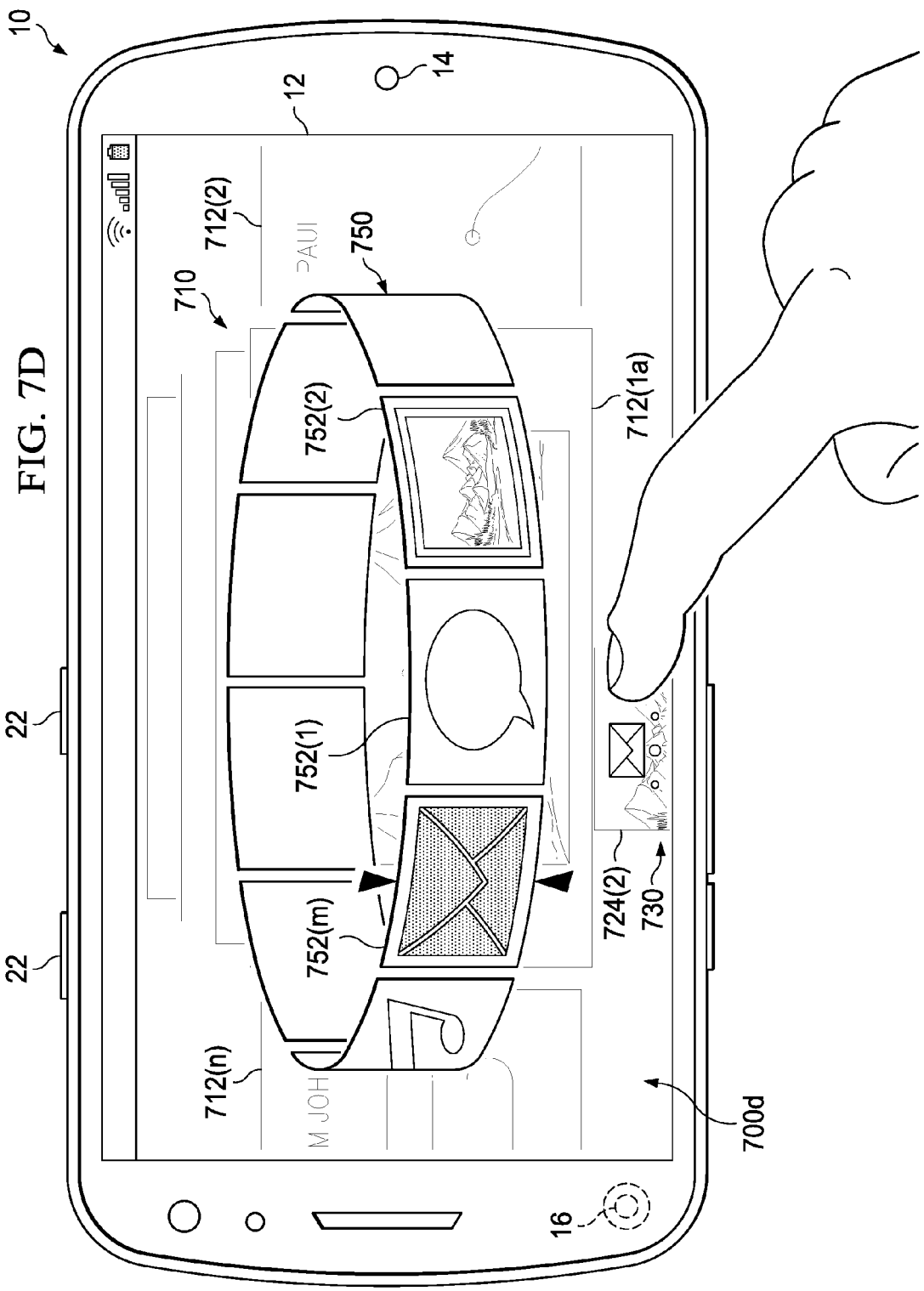

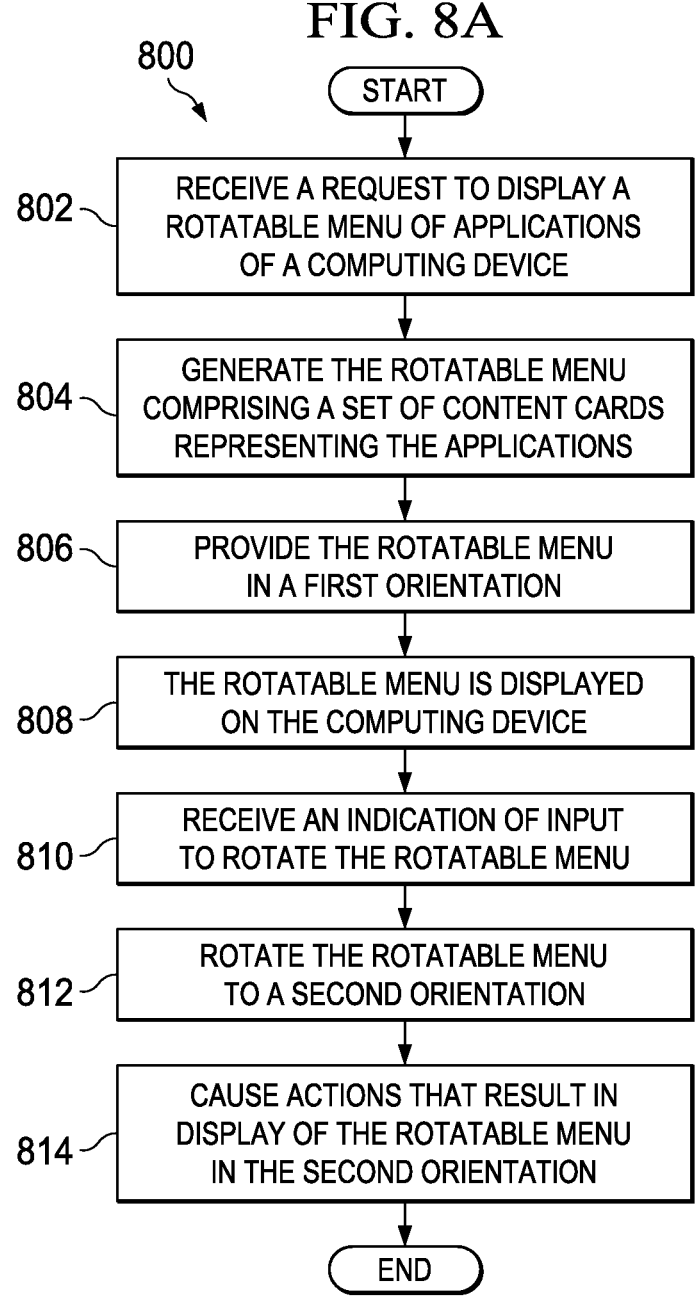

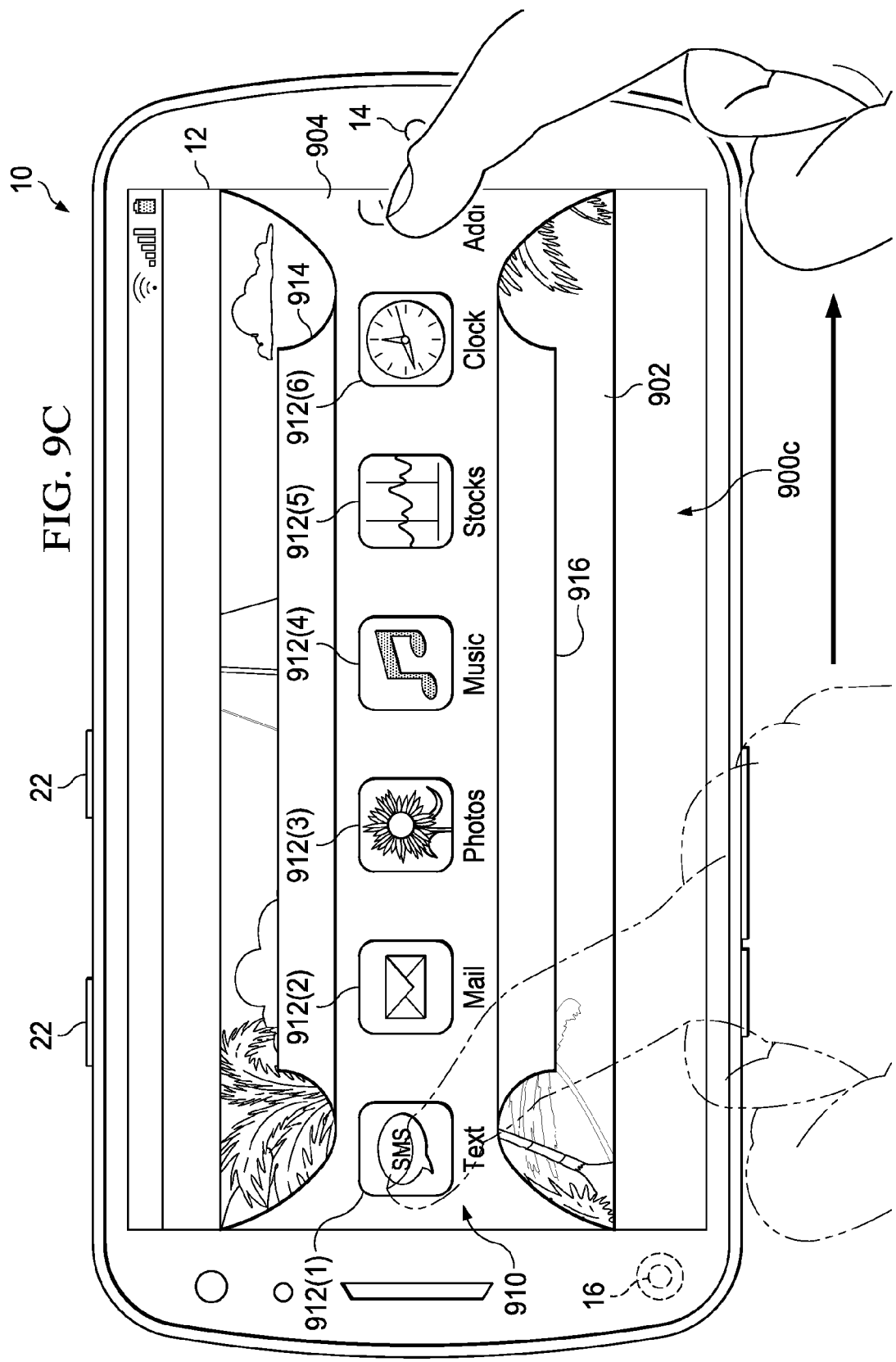

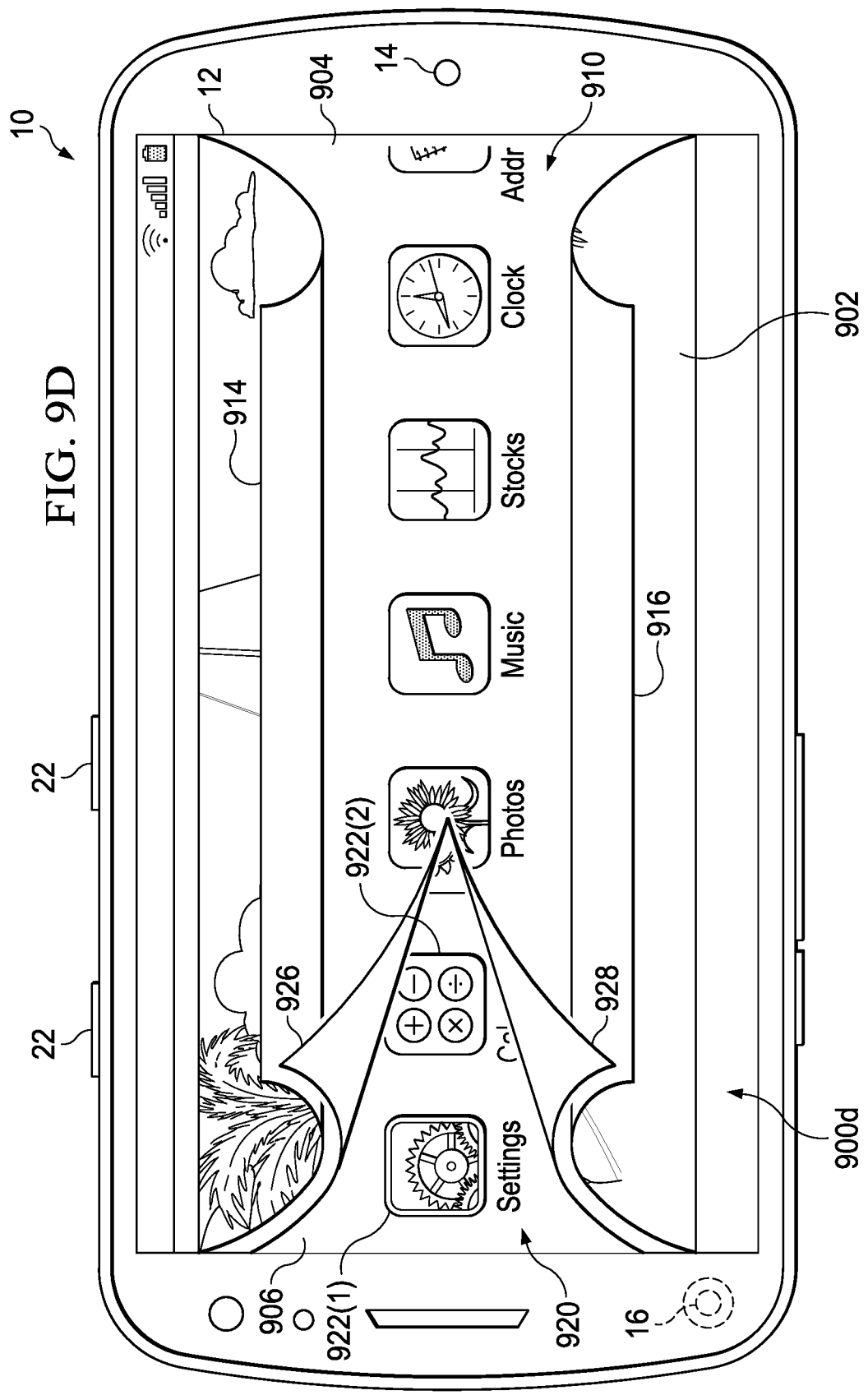

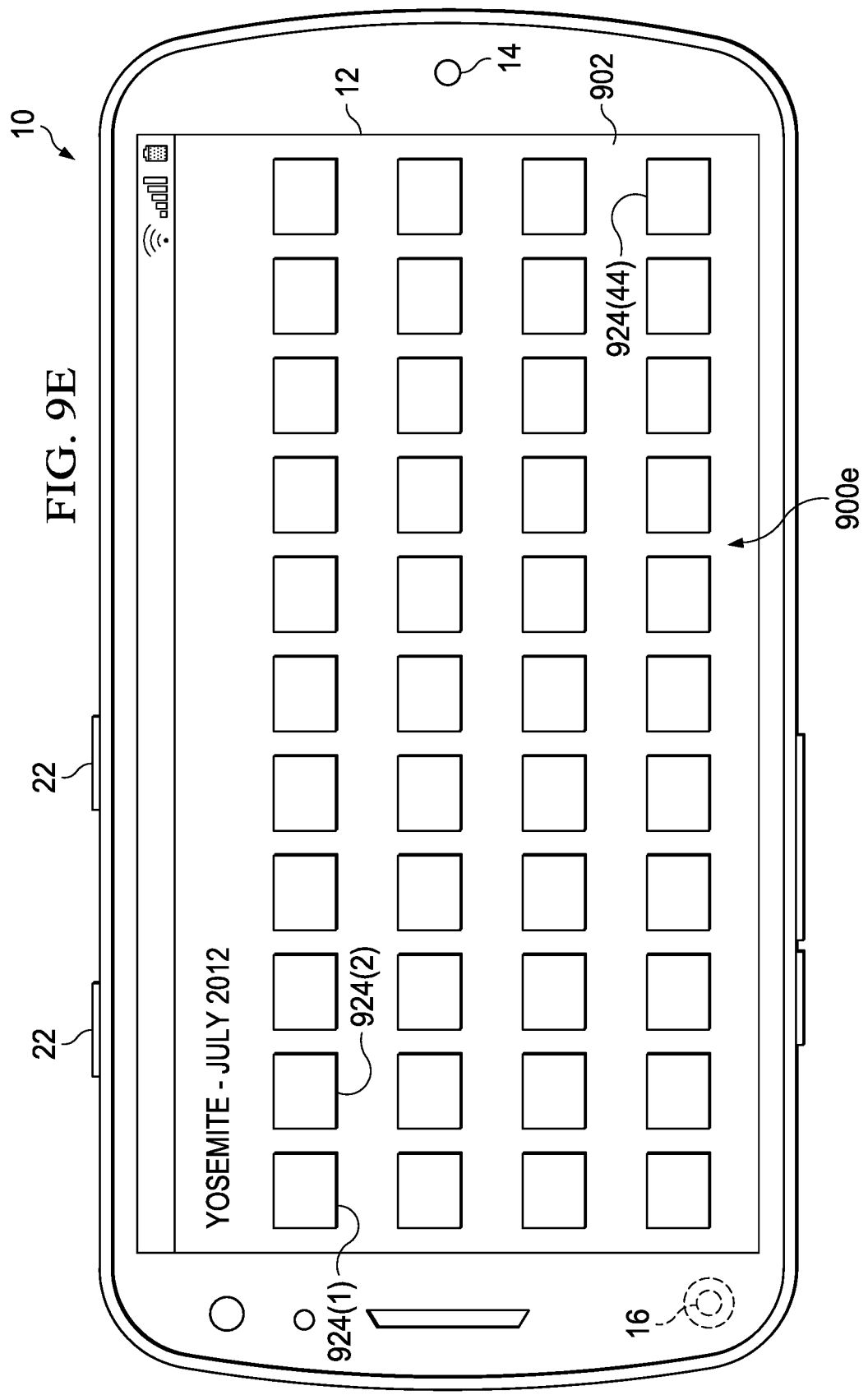

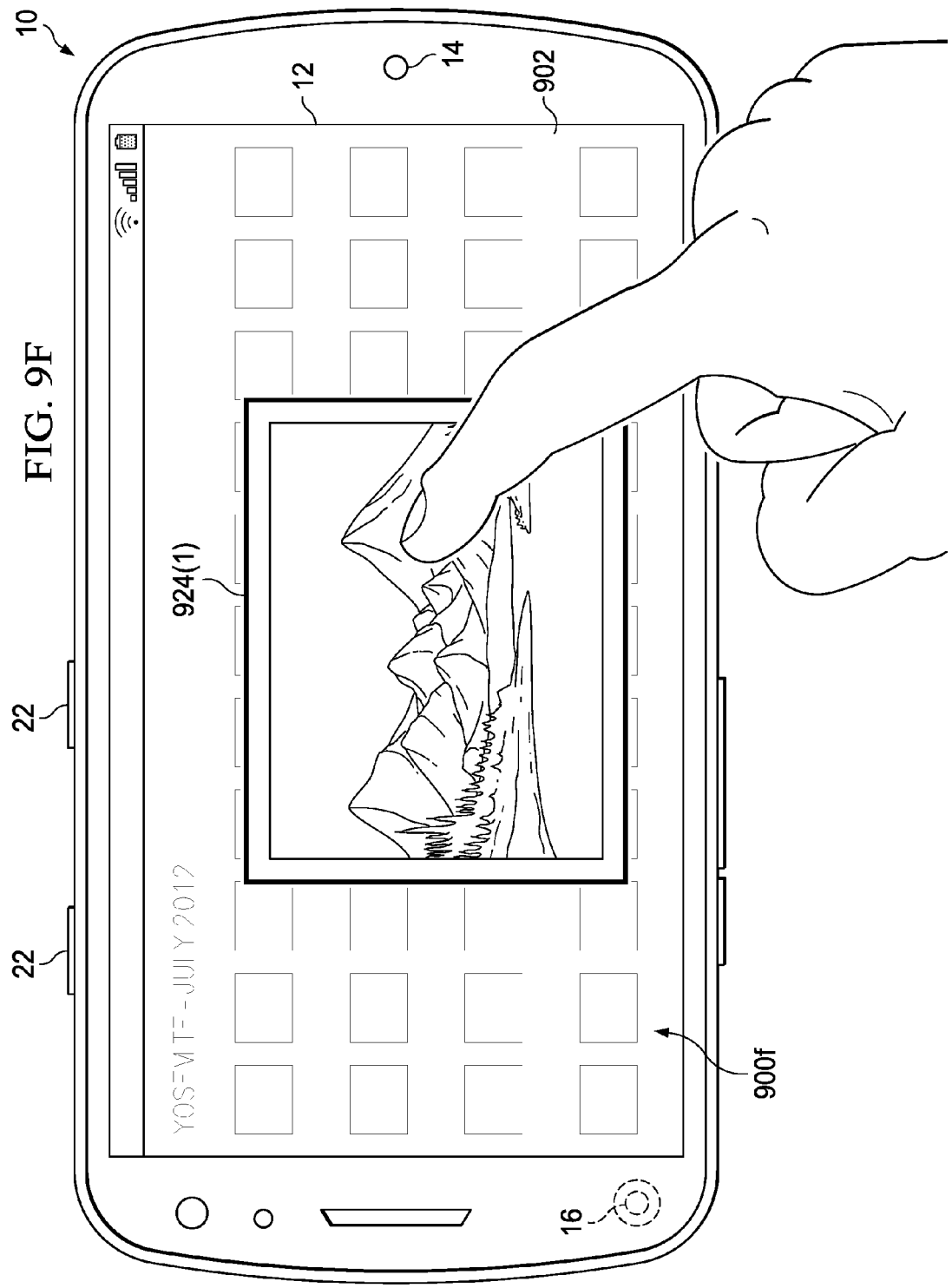

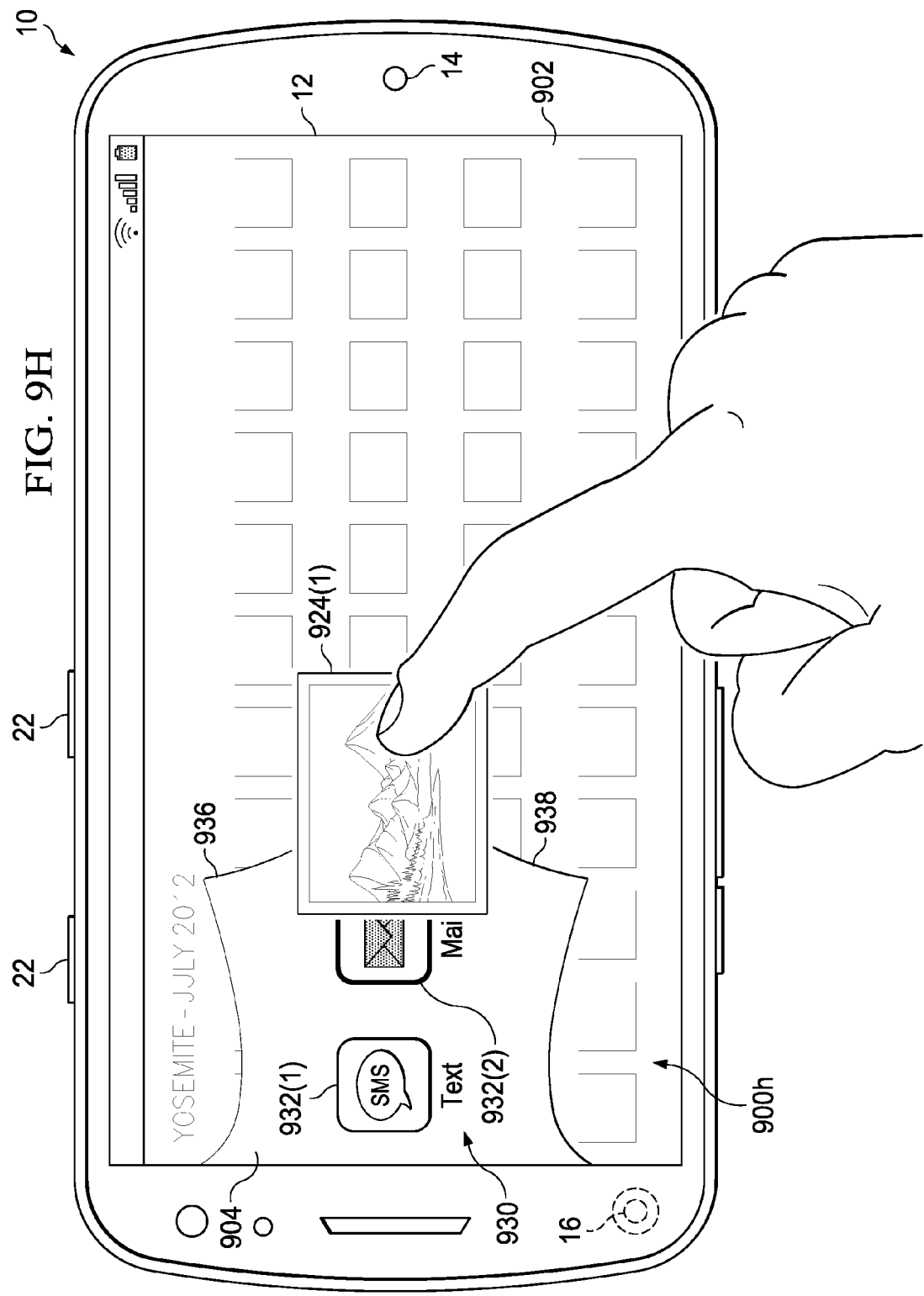

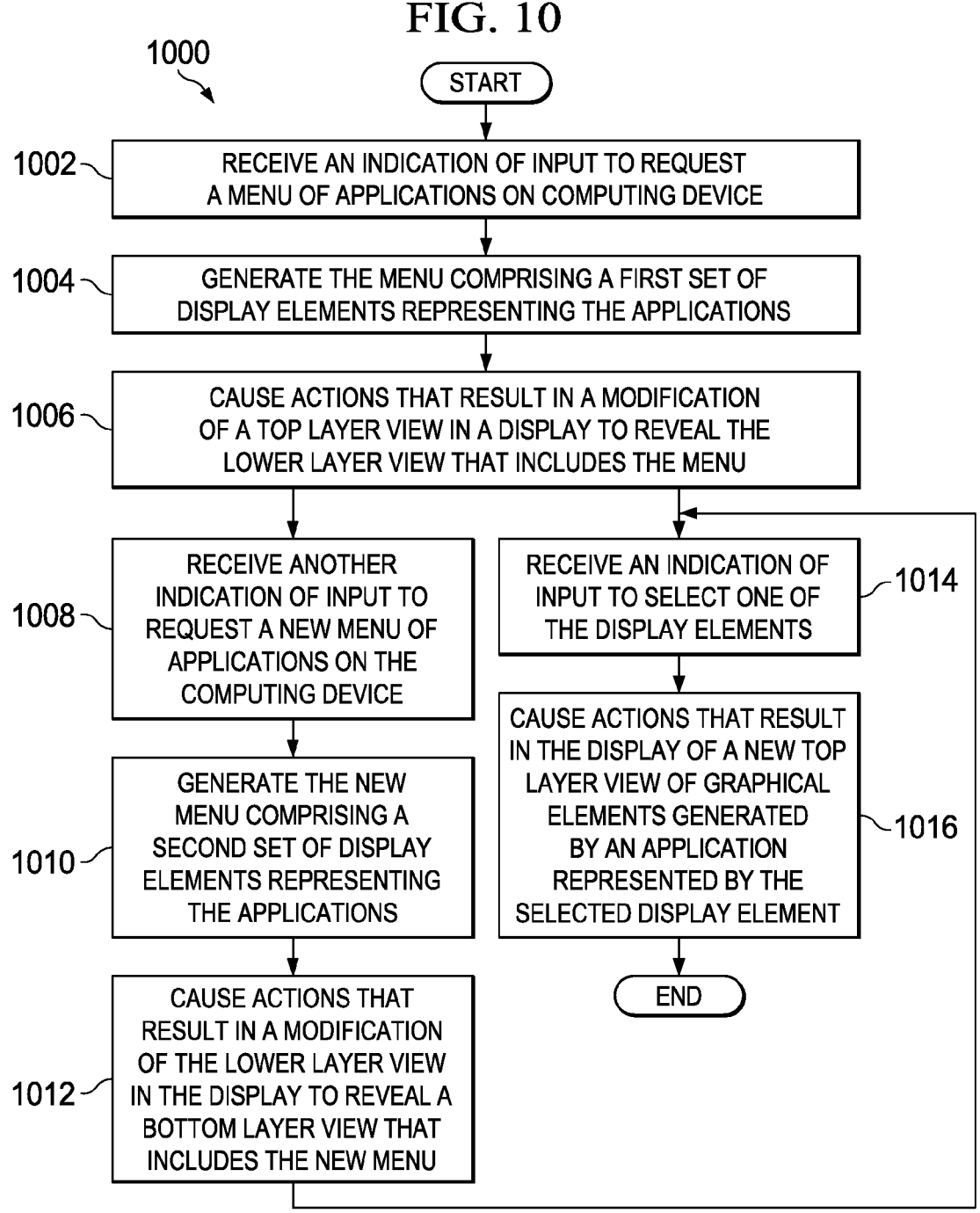

US 9,448,694 B2

GRAPHICAL USER INTERFACE FOR NAVIGATING APPLICATIONS

CROSS REFERENCE TO RELATED APPLICATIONS

This patent application claims the benefit of priority under 35 U.S.C. §119(e) of U.S. Provisional Application No. 61/724,820, filed Nov. 9, 2012, entitled "GRAPHICAL USER INTERFACE—CARDS CONCEPT," naming inventors Sameer Sharma, et al., and of U.S. Provisional Application No. 61/724,817, filed Nov. 9, 2012, entitled "GRAPHICAL USER INTERFACE—SPLIT CONCEPT," naming inventors Sameer Sharma, et al. Both of these prior applications are hereby incorporated by reference in their entireties.

TECHNICAL FIELD

This disclosure relates in general to the field of computing devices and, more particularly, to a graphical user interface for efficiently navigating applications on a computing device.

BACKGROUND

End users have more media and communication choices than ever before. A number of prominent technological trends are changing the media landscape. These trends include more computing devices, more applications, more online video services, and more customizable features, among others. In regards to mobility, companies such as Apple, Inc., along with its mobile product lines (e.g., iPhone™, iPad™, iPod™, etc.), have successfully executed on the application model. As a natural consequence, operating systems (e.g., Microsoft Windows 8/Metro™) have changed to comply with this explosive application model.

One shortcoming of the application model involves managing the numerous applications on a typical device. Home screens are often cluttered with application icons and lack efficient navigational tools and multitasking capabilities. With many mobile devices now available with 32 gigabyte and even 64 gigabyte memory, users could potentially acquire hundreds, or even thousands, of applications. Paging through many screens to view so many applications is inefficient. Although applications can be grouped into folders, navigation through the folders can be cumbersome and frustrating if the user cannot remember the folder in which a particular application was stored. Additionally, the inability of applications to be accessed directly from a current application on the mobile screen inhibits the ability of the user to multitask.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a diagram of an example mobile device with multiple applications according to at least one embodiment;

FIG. 2 is a simplified block diagram of a communication system for providing menu management and navigation of a mobile device according to at least one embodiment;

FIGS. 3A-3D are diagrams of example user interfaces on a mobile device illustrating a rotatable menu for navigating applications according to at least one embodiment;

FIGS. 5A-5B are diagrams of example user interfaces on a mobile device illustrating vertical scrolling of a zoomed-in view of a rotatable menu according to at least one embodiment;

FIGS. 6A-6B are diagrams of example user interfaces on a mobile device illustrating use of a rotatable menu according to at least one embodiment;

FIGS. 7A-7E are diagrams of example user interfaces on a mobile device illustrating interaction with an application displayed in a rotatable menu according to at least one embodiment;

FIGS. 8A and 8B are simplified flowcharts illustrating possible operations associated with a user interface with a rotatable menu according to at least one embodiment;

FIGS. 9A-9I are diagrams of example user interfaces on a mobile device illustrating use of a split screen menu according to at least one embodiment;

FIG. 10 is a simplified flowchart illustrating possible operations associated with a user interface with a split screen menu according to at least one embodiment;

DETAILED DESCRIPTION OF EXAMPLE EMBODIMENTS

Example Embodiments

Figure 4A:
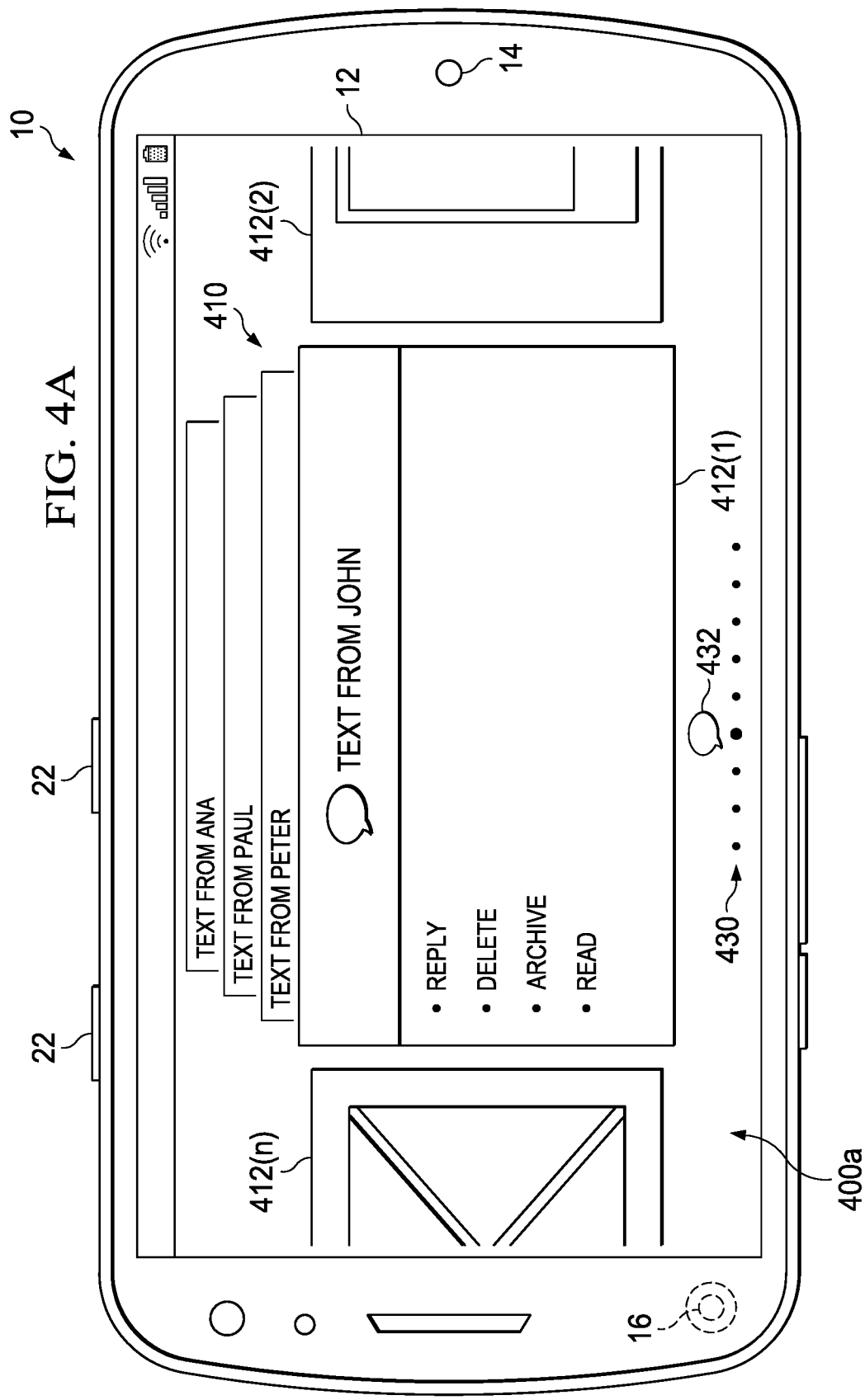
FIGS. 4A-4B are diagrams of example user interfaces on a mobile device illustrating examples of zoomed-in views of a rotatable menu according to at least one embodiment.

FIG. 1 is a block diagram of an example mobile device 10. In at least one embodiment, mobile device 10 includes a display 12, a home button 14, and a motion sensor (not shown) that detects an orientation (e.g., portrait or landscape) of mobile device 10. Applications are represented by corresponding application icons 20 on display 12. Display 12 may be touch-sensitive to enable selection of an application by touching a location of the display that corresponds to a display element (e.g., an icon) representing the desired application. Mobile device 10 may also include many other features including, but not limited to, a camera lens 16, volume control buttons 22, and other features such as an audio jack, a microphone, a proximity sensor, a flash for the camera, and a speaker. Communications devices may also be provided in mobile device 10 including, but not limited to, the Institute of Electrical and Electronics Engineers (IEEE) Std 802.11™-2012, Bluetooth™ interface, cellular interface, etc.). Other communication protocols may also be supported such as, for example Near Field Communications (NFC), Radio Frequency Identification (RFID), etc. Examples of mobile device 10 can include, a cellular phone, a smart phone, a personal digital assistant (PDA), a tablet, a gaming device, an appliance, a media device, and any other computing device that supports an application model framework.

FIG. 2 is a block diagram of a communication system 50 configured for providing menu management and application navigation capabilities in mobile device 10 in accordance with at least one embodiment of the present disclosure. Communication system 50 may include mobile device 10 and an end user 52 engaged in a communication exchange. End user 52 may communicate with mobile device 10 using any suitable interface (e.g., touch-sensitive screen, keyboard, stylus on touch-sensitive screen, physical buttons, voice, etc.). In communication system 50 shown in FIG. 2, mobile device 10 includes a foreground application 62, with which end user 52 may interact. Mobile device 10 may also include a plurality of background applications 60(1)-60(x), a menu manager 64, a screen real estate module 66, and context rules 68. End user 52 may also communicate with menu manager 64, or an application provided by menu manager 64. As used herein, an 'application' is intended to mean a set of instructions or operations, often in the form of software, that can be performed by a computing device (e.g., mobile device 10), where the set of instructions or operations typically perform a task or set of tasks and may be configured to interact (via input and/or output) with an end user.

Before detailing some of the possible capabilities and features of the platform of FIG. 2 and its infrastructure, it is important to understand some of the operating system challenges encountered in an application model. The following foundational information may be viewed as a basis from which the present disclosure may be properly explained.

The inability of a menu of applications to be accessed directly from a current application on a mobile screen (i.e., the display of a mobile device), inhibits the ability of an end user to multitask and contributes to inefficient use of the mobile device. Stated in different terminology, in current mobile contexts, when an end user launches an application, the application becomes a 'foreground application' and typically occupies the entire real estate of the mobile device screen. In order to switch to another application, the end user is forced to toggle back to the home screen to select a separate application, or to use another gesture in order to retrieve to the list of applications running in the background, and subsequently launch another application, which then appears in the screen foreground. Once the user toggles to the home screen, the previous application is removed from the screen. Once a new application is launched, the newly selected application, once again, occupies the entire real estate of the mobile device screen. Furthermore, to get back to the previous application, the end user has to go through the whole process again.

Consider an example involving a simple social media application (e.g., Facebook™). If an end user opens the Facebook™ application, she can begin moving through pictures, news feeds, etc. While browsing, this particular user notices a comment by a friend about an upcoming event this weekend. As a result, the end user quickly launches her weather application in order to check the forecast for the weekend. While that weather application loads, the user begins multitasking by checking stock prices, reviewing work e-mail, etc. Once the weather application is fully functional, the end user reviews the information, and then returns to the Facebook application. During the day, the user can continue to have all of these applications open, as she systematically maintains loose connections to these applications on a relatively regular basis.

Many operating systems (OSes such as Linux™, Windows™, etc.) have created the concept of a window that can be resized, or even minimized, in order to allow users visibility into many applications concurrently. These operating systems provide tabs to applications, allowing a quick transition for the end user. While this may work for some limited desktop scenarios, due to ever-decreasing screen sizes and interaction models, such a model does not work for mobile devices.

The quantity of applications on a typical mobile device can also be problematic for an end user. A large number of applications on a mobile device exacerbates the inability to access another application directly from a current application. When an end user toggles out of a current application in order to access a different application, she may have to page through multiple screens seeking the icon representing the desired application. Some users hide infrequently used applications in an effort to de-clutter their home screen, which can make these applications even more difficult to find. For many end users, the original train of thought may be forgotten before the desired icon is ever located. This may be even more prevalent for older users or when any interruption or distraction occurs during the search for the desired icon. Without the previous application as a reminder of the end user's train of thought, the end user may be forced to give up the search and return her original task in the previous application. Thus, another search for an icon representing the previous application has to be undertaken. This can be a cumbersome and frustrating experience for the end user.

In accordance with the teachings of the present disclosure, embodiments of the framework of FIG. 2 can allow for more efficient menu management of applications and intuitive navigation between applications. These menu management and navigation features can provide an enhanced mobile device experience for an end user. In at least some embodiments, a user interface, which may be a graphical user interface (GUI), provides intuitive application navigation using transparency and layering. These embodiments allow an end user to switch quickly between applications and application actions, enable seamless multitasking, provide contextual menus, and potentially bypass a typical home screen.

In at least one embodiment, the end user is provided with a contextual menu of applications, represented by content cards in a rotatable carousel configuration. The rotatable menu can be zoomed-in to provide access to an application, represented by one of the content cards. The zoomed-in view may also permit horizontal scrolling to allow interaction with applications represented by the other content cards in the carousel. In at least one embodiment, the content cards may be provided in the rotatable menu in a contextual order, to provide the user with quick access to the most relevant applications. Furthermore, a user may be permitted to multitask by dragging and dropping an object (e.g., a picture, a document, a video, etc.) from a foreground application into an application represented by another content card in the carousel.

In at least one other embodiment, the user may be provided with the ability to view display elements that represent applications, while interacting with a current application. In this embodiment, by swiping a touch screen displaying a graphical view of data generated (or otherwise provided) by a foreground application, the view can be split to reveal another view in a lower layer. The lower layer view may include display elements that represent contextually relevant background applications. Swiping the lower layer view may reveal yet another view in an even lower layer, or 'lowest layer'. This lowest layer view may include display elements that represent additional applications. This lowest layer could, in some embodiments, include the display elements for the entire application library of the mobile device. Thus, the embodiments provide features that allow an end user to easily navigate representations of applications (e.g., content cards or display elements, depending on the embodiment) from a foreground application, where the representations are provided in an intuitive display, and potentially provided in a contextually relevant manner, as further detailed below.

Turning to FIG. 2, an example block diagram illustrating a communication system 50 provides a menu management and application navigation system for mobile device 10. End user 52 may be communicating with foreground application 62 via a view of graphical elements, generated by foreground application 62 and provided on display 12 of mobile device 10. Multiple background applications 60(1) through 60(x) may be provided in mobile device 10. Menu manager 64 can determine which application is running in the foreground (e.g., foreground application 62) and which applications are running in the background (e.g., background applications 60(1)-60(x)). Generally, a foreground application (also referred to herein as 'current application') is intended to mean an application that currently receives input on a mobile device. Typically, a foreground application provides images (or views) occupying most or all of display 12. Background applications 60(1)-60(x) may still be running, but are typically not allocated priority to a processing element and other resources.

In a rotatable menu embodiment, menu manager 64 may be adapted to provide a comprehensive set of representations of applications in a rotatable menu on display 12. In a split screen menu embodiment, menu manager 64 may be adapted to provide a comprehensive set of representations of applications in a split screen menu on display 12. As used herein, representations of applications are intended to include graphical pictures or symbols, which may include text and/or numeric data, that can be provided as a viewable representation of an application on a mobile device. Commonly used representations include icons, examples of which are shown as icons 20 in FIG. 1. Other representations of applications could include graphical elements provided by the application itself. As used herein, a 'graphical element' is intended to include any graphical, numerical, textual, or other visual object that can be displayed and viewed on display 12. Possible examples of graphical elements could include, but are not limited to, an inbox of an email application, an email, a text message, local weather information of a weather application, a video still of a video application, an individual photograph of a photograph application, etc.

Menu manager 64 may also be configured to access context rules 68 to determine which applications are most relevant to each other, to a foreground application if one is running, or to an end user. Context rules can be configured according to any desired criteria such as, for example, an end user's behavior. For instance, context rules could be used to identify certain applications as contextually relevant by determining which applications are invoked by an end user during a certain time of the day, week, month, etc. End user 52 may, for example, do certain checks during the day that involve particular applications. In a possible scenario, end user 52 may check emails, weather, stock prices, text messages, and social media in the morning before going to work. Based on context rules 68, menu manager 64 can determine that an email application, a weather application, a stock ticker application, a texting application, and a social media application are the most contextually relevant for end user 52.

Contextually relevant applications may also be determined based, at least in part, on input from an end user. In particular, when a user selects an object associated with a current application and provides appropriate input to indicate a desire to perform an action on the object, then contextually relevant applications may include any application configured with the capability of performing an action on the object. For instance, if a user selects a photograph while running a photograph application, and the user provides appropriate input, contextually relevant applications may be identified as applications that can receive the selected photograph as input and that have the capability of performing an action on the object (e.g., messaging applications, email applications, etc.).

In a rotatable menu embodiment, menu manager 64 may be adapted to provide a contextually relevant set of representations of applications in a rotatable menu on display 12. Menu manager 64 may generate a rotatable menu of applications, possibly having a carousel configuration. Menu manager 64 may position representations of the contextually relevant applications adjacent to each other in the carousel configuration. In other scenarios, (e.g., when an end user provides input that indicates a desire to perform an action on an object associated with a current application), a rotatable menu may be generated and may include only representations of contextually relevant applications.

In a split screen menu embodiment, menu manager 64 may be adapted to provide a contextually relevant set of representations of applications in a split screen menu on display 12. Menu manager 64 may generate a menu of applications that includes a set of representations that are contextually relevant to a current application or to an end user. This set of representations may be provided in a lower layer of display 12. Another split screen menu including another set of representations (e.g., comprehensive set of representations) may be provided in a bottom (or lowest) layer.

Screen real estate module 66 can provide layering and transparency in the display of mobile device 10, for achieving the embodiments described herein. In particular, in certain instances, a graphical representation of a rotatable menu may be provided for display, overlaying a graphical view provided by foreground application 62. In other instances, a rotatable menu may be zoomed-in, such that a graphical view provided by foreground application 62, or a modified form of foreground application 62, is located in a predominant, center portion of the display. In this scenario, a slice or partial view of the adjacent representations of other applications in the rotatable menu may be displayed to the left and right of the predominant center portion of the display. Thus, the slices of the adjacent representations of applications may provide end user 52 with a visual reminder that horizontal scrolling to the left or right will provide direct access to other applications that are contextually relevant to the current application. Screen real estate module 66 may be configured to define the display areas where transparency and layering enable views of a rotatable menu to be visible to end user 52 via display 12.

In the split screen menu embodiment, layering and transparency enable a top layer view, provided by foreground application 62, to appear to split and roll back to reveal a lower layer view with display elements, in response to appropriate input by an end user. Display elements can be representations of applications and may be configured as icons in at least one embodiment. In at least one embodiment, the lower layer view may have a limited number of display elements representing applications that are contextually relevant to foreground application 62 or an end user. The lower layer view may also be adapted to interact with an end user. Using appropriate gestures (e.g., swiping with a finger or stylus) the user can cause the lower layer view to split and roll back to reveal a lowest layer view with more display elements. In this lowest layer, in at least one embodiment, the display elements may be presented in a scrollable image to enable end user 52 to access any desired application on mobile device 10. Display elements in both the lower layer view and the lowest layer view may be selectable by a user to cause an application represented by the selected display element to begin running in the foreground and to provide views of graphical elements for display in the top layer of display 12. Screen real estate module 66 may be configured to define the display areas where transparency and layering enable views in a lower layer and a lowest layer to be visible to end user 52 via display 12.

Turning to FIGS. 3A through 7E, diagrams of mobile device 10 with display 12 illustrate various screenshots as examples of graphical user interfaces (GUIs) according to embodiments disclosed herein. GUIs are user interfaces that enable users to interact with electronic devices (e.g., mobile device 10) using images. Generally, the screenshots present views of a rotatable menu of applications and of results of end user interactions involving the rotatable menu. A view includes one or more graphical elements that can be provided by an application to be displayed on display 12. In some instances, a view may be layered over a currently displayed view in display 12 such that the currently displayed view is completely or partially covered. In at least some embodiments, the mobile device can display the rotatable menu (and other graphical views) on a touch-sensitive display and an end user can interact with the rotatable menu by touching the touch-sensitive display with a finger or stylus, for example, using appropriate gestures (e.g., swiping, tapping, touching and holding, etc.). In at least one embodiment, a finger gesture can include a single-finger or multi-finger gesture. The interaction can include input from the end user and an indication of the input can be provided to menu manager 64. Input can be in the form of data or signals (e.g., selections, commands, requests, etc.).

Screenshots 300a-300d of FIGS. 3A-3D are provided as examples of possible views involving a rotatable menu of applications, where each application is represented by a content card. A 'content card' as used herein can be a graphical representation of a single application or multiple applications on the mobile device, and can define an area of a display in which the application (or a portion thereof) may provide graphical elements to be displayed, including interactive graphical elements. In at least one embodiment, a set of content cards that are provided in a rotatable menu, may have a dimensional appearance of postcards arranged in a carousel configuration.

FIG. 3A is a diagram of mobile device 10 with screenshot 300a in display 12. Screenshot 300a presents a view of an example rotatable menu 310 with a set of content cards 312(1), 312(2), 312(3) through 312(n). In a possible implementation, each one of content cards 312(1)-(n) represents a different application in mobile device 10. In other implementations, one or more of content cards 312(1)-(n) each represent a content card folder, and each content card folder contains two or more applications in mobile device 10. Content card folders may be configured by end users and/or may be preset to have certain applications together (e.g., related applications grouped together in one folder). In at least one embodiment, selection of a content card folder by a user may result in a view of another rotatable menu including another set of content cards representing applications associated with the selected content card folder. In at least one embodiment, the rotatable menu can be seen in either a landscape orientation (i.e., as shown in FIG. 3A) or in a portrait orientation.

In at least one embodiment, applications corresponding to content cards 312(1)-(n) remain in an open state and provide a front facing view of the application on cards 312(1)-(n). This front facing view can be, in at least some embodiments, the point where the application begins when it runs in the foreground. For example, a video application that was paused in the middle may provide a front facing view of a video still at the point where it was paused.

In FIG. 3A, rotatable menu 310 is shown having an orientation with content card 312(1) positioned in a front facing, center location. Similar to a real carousel, rotatable menu 310 may be rotated to the left and/or to the right to view other content cards 312(2)-(n) within the carousel and to change between applications. In at least one example, an end user may rotate the carousel using any appropriate input mechanism. For example, on a touch screen display, a user may use a finger or other suitable item (e.g., a stylus) to swipe the touch screen in the desired direction of rotation. In another embodiment, directional arrows may be provided on display 12 to allow an end user to rotate the carousel to the left or the right. In yet another embodiment, a physical mechanism (e.g., arrow buttons) may be used to rotate the carousel.

The view of rotatable menu 310 may be adapted to allow an end user to select one of content cards 312(1)-(n), where the application represented by the selected content card begins to run as a foreground application. In at least one embodiment, the front facing, center location of rotatable menu 310 is configured to allow selection, by an end user, of the particular content card that is displayed in that center location at any given time. In at least one other embodiment, multiple content cards of the rotatable menu may be selectable at any given time. For example, front facing content cards 312(1), 312(2) and 312(n) may be selectable when rotatable menu 310 is displayed in the orientation shown in FIG. 3A. In at least one embodiment, a content card may be selected using any suitable input commands including, but not limited to, touching the display corresponding to the location of the selected content card. In the example illustration of FIG. 3A, content card 312(1) is displayed in the front facing, center location of rotatable menu 310, and represents a movie application. Content card 312(1) may be selected by an end user in order to run the movie application as a foreground application.

FIG. 3B is a diagram of mobile device 10 with screenshot 300b in display 12. Screenshot 300b presents a possible resulting view in display 12 after an end user selects content card 312(1), from the center location of rotatable menu 310 in FIG. 3A. In this example scenario, screenshot 300b illustrates an example graphical user interface presenting a movie provided by the movie application corresponding to selected content card 312(1).

FIG. 3C is a diagram of mobile device 10 with screenshot 300c illustrating a possible resulting view after an end user interacts with mobile device 10 (e.g., by tapping on display 12, by pressing a control button, etc.) to send a command to the movie application and/or the menu manager. Interaction by the user may result in movie controls being displayed across the movie, for example, as configured by the movie application. Interaction may also result in a menu control element 330 being displayed somewhere in display 12.

Menu control element 330 could be any graphical element or icon that is configured in a location on display 12 where a user can provide input to access a zoomed-out view of the rotatable menu. Menu control element 330 could be displayed using layering across the movie. Alternatively, menu control element 330 could be displayed in another location of display 12 where the movie is not displayed, as illustrated in FIG. 3C. In this example illustration, menu control element 330 is presented as a task bar with a graphical representation of a foreground application 332 (i.e., the movie application). A zoomed-out view of rotatable menu 310 could be requested by an end user, for example, by interacting with menu control element 330. In at least one embodiment, the area of display 12 that corresponds to menu control element 330 may be configured to allow an end user to select other content cards directly from menu control element 330, without invoking a display of the zoomed-out view of the rotatable menu. In other embodiments, menu control element 330 could simply be a graphical representation of the rotatable menu, selectable by the user to display rotatable menu 310.

FIG. 3D is a diagram of mobile device 10 with screenshot 300*d* illustrating a possible resulting view after an end user interacts with mobile device 10 to send a command to display the rotatable menu. In this example, rotatable menu 310 is displayed using layering over the last view provided for display, which is the movie in this example scenario. The end user can select another content card by rotating rotatable menu 310 or may simply decide to return to the movie by selecting content card 312(1).

The view of rotatable menu 310 may also include an interactive tool (e.g., a graphical representation of arrows on display 12) adapted to allow an end user to zoom-in or zoom-out of the view of rotatable menu 310. In at least some embodiments, the view of rotatable menu 310 may respond to a single or multi-touch input from an end user to zoom-in or zoom-out. In at least some embodiments, the view of rotatable menu 310 may be adapted to allow a user to zoom-in or zoom-out by selecting a content card.

Figure 4B:
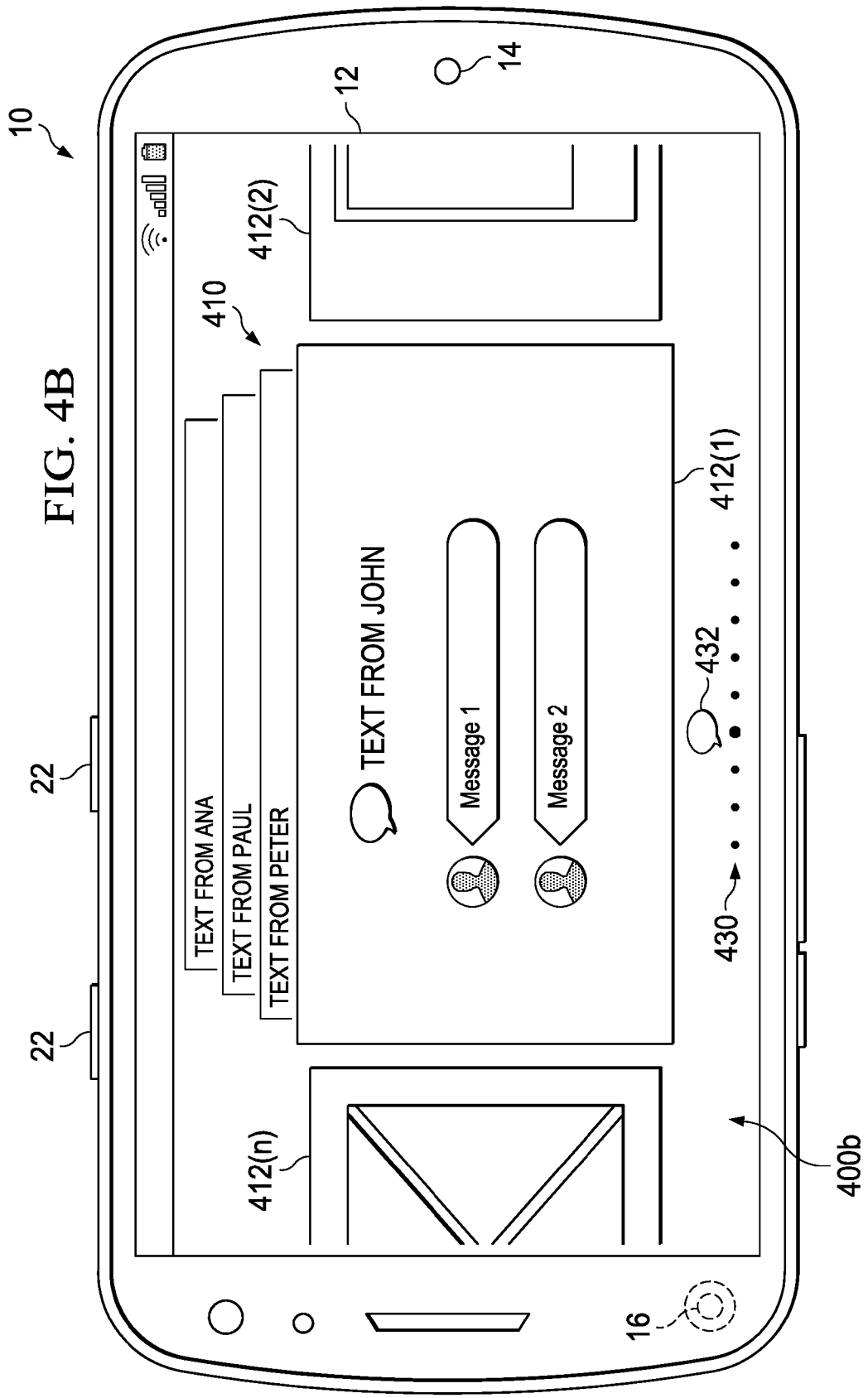

In FIGS. 4A-4B, screenshots 400*a*-400*b* provide examples of zoomed-in views involving another possible rotatable menu of applications. FIG. 4A is a diagram of mobile device 10 with screenshot 400*a* in display 12. Screenshot 400*a* presents a zoomed-in view of another possible rotatable menu 410. The example zoomed-in view provides a graphical representation, in content card 412(1), of text messages generated by a texting application that may be running in the foreground of mobile device 10. In at least one example, in the zoomed-out view, content card 412(1) (positioned between content cards 412(2) and 412(*n*) in rotatable menu 410) was displayed in the center location of rotatable menu 410. Thus, when an end user zoomed-in on the zoomed-out view of rotatable menu 410, the texting application, or a portion thereof, began running in the foreground of mobile device 10 and displaying its contents in a location defined for content card 412(1) in the zoomed-in view. In at least one embodiment, this location can define a dominant portion of display 12 and may be generally centered in the display. The texting application may be adapted to allow the end user to interact by navigating deeper into views of other text messages in content cards layered behind content card 412(1). In some embodiments, deeper navigation of text messages may be accomplished by vertically swiping display 12. Additionally, a menu control element 430 is presented as a task bar with a graphical representation of a foreground application 432 (i.e., the texting application). A zoomed-out view of rotatable menu 410 could be requested by an end user, for example, by interacting with menu control element 430.

FIG. 4B is a diagram of mobile device 10 with screenshot 400*b* in display 12. Screenshot 400*b* presents another zoomed-in view of rotatable menu 410. In FIG. 4B, a graphical representation of text messages in content card 412(1) presents an activity (e.g., 'READ') selected by an end user from screenshot 400*a* of FIG. 4A. Thus, an end user may interact with an application, such as the texting application, through the graphical user interfaces provided in a zoomed-in view of rotatable menu 410. When the desired task is completed, the end user may return to a previous application by using the rotatable menu or by swiping horizontally to the previous application.

In FIGS. 5A-5B, screenshots 500*a*-500*b* provide examples of zoomed-in views involving yet another possible rotatable menu of applications. FIG. 5A is a diagram of mobile device 10 with screenshot 500*a* in display 12. Screenshot 500*a* presents a zoomed-in view of another possible rotatable menu 510. The example zoomed-in view provides a graphical representation, displayed in content card 512(1), of inbox email messages generated by an email application that may be running in the foreground of mobile device 10. In at least one example, in the zoomed-out view, content card 512(1) (positioned between content cards 512(2) and 512(*n*) in rotatable menu 510) was displayed in the center location of rotatable menu 510. Thus, when an end user zoomed-in on the zoomed-out view of rotatable menu 510, the email application, or a portion thereof, began running in the foreground of mobile device 10. The email application may be configured to display its contents in a location defined for content card 512(1) in the zoomed-in view. The email application may be adapted to allow the end user to interact by navigating deeper into views of other email messages in content cards, such as content card 512(1*a*) and others, layered behind content card 512(1). Additionally, another embodiment of menu control element 530 is provided in FIGS. 5A-5B, as a graphical representation of the rotatable menu, selectable by the user to display a zoomed-out view of rotatable menu 510.

FIG. 5B is a diagram of mobile device 10 with screenshot 500*b* in display 12. Screenshot 500*b* provides a zoomed-in view of rotatable menu 510. FIG. 5B also illustrates the use of a finger of an end user to interact with the email application to navigate deeper into more views of email messages. In at least one embodiment, the end user uses a finger to swipe vertically (i.e., down or up) on a top layer email message displayed in content card 512(1), such that content card 512(1) is vertically scrolled to reveal a lower layer email message displayed in content card 512(1*a*). The end user may continue navigate to deeper layers of email messages by interacting with the email application via the graphical user interface. Slices of adjacent content cards 512(2) and 512(*n*) can remain on the left and right sides, respectively, of the displayed email messages.

Figure 6B:
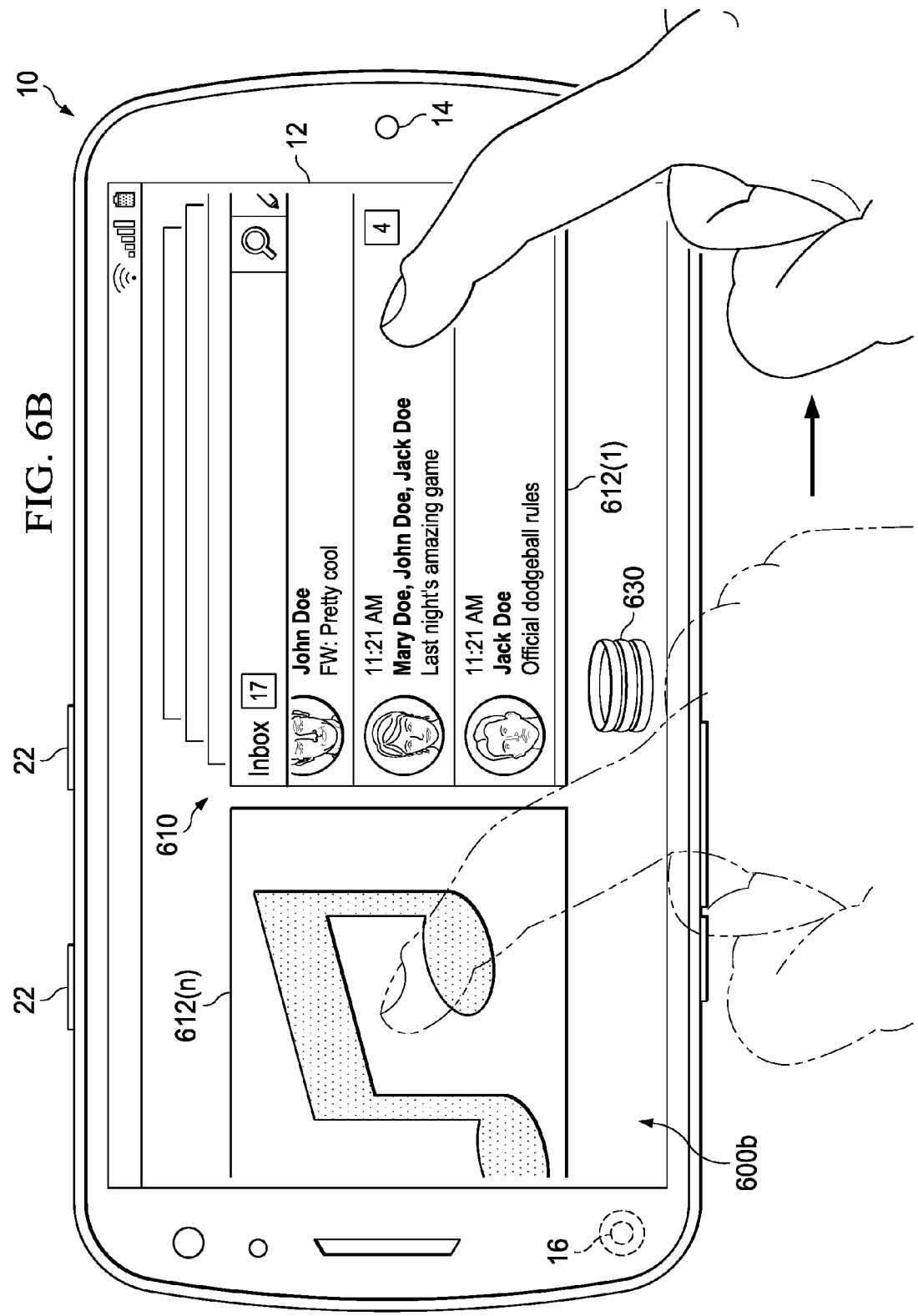

In FIGS. 6A-6B, screenshots 600*a*-600*b* provide examples of zoomed-in views involving yet another possible rotatable menu of applications. FIG. 6A is a diagram of mobile device 10 with screenshot 600*a* in display 12. Screenshot 600*a* presents a zoomed-in view of another possible rotatable menu 610. The example zoomed-in view provides a graphical representation, in content card 612(1), of an inbox message list generated by an email application that may be running in the foreground of mobile device 10. In at least one example, in the zoomed-out view, content card 612(1) (positioned between content cards 612(2) and 612(*n*) in rotatable menu 610) was displayed in the center location of rotatable menu 610. Thus, when an end user zoomed-in on the zoomed-out view of rotatable menu 610, the email application, or a portion thereof, began running in the foreground of mobile device 10. The email application may be configured to display its contents in a location defined for content card 612(1) in the zoomed-in view. The email application may be adapted to allow the end user to interact by navigating deeper into further views of the inbox message list layered behind content card 612(1). Additionally, another embodiment of menu control element 630 is provided in FIGS. 6A-6B, as a graphical representation of the rotatable menu, selectable by the user to display a zoomed-out view of rotatable menu 610.

FIG. 6B is a diagram of mobile device 10 with screenshot 600b in display 12. Screenshot 600b provides a zoomed-in view of rotatable menu 610. FIG. 6B also illustrates the use of a finger of an end user to interact with the email application to navigate horizontally (i.e., to the left, or counterclockwise) through rotatable menu 610, to change applications. As rotatable menu 610 is rotated, the email application may stop running in the foreground of mobile device 10 and move to the background. A music application, or a portion thereof, represented by content card 612(n) may begin running in the foreground of mobile device 10 and potentially provide views to be displayed on display 12, which may be adapted to allow interaction by an end user. In at least one embodiment, the end user may also or alternatively navigate horizontally through rotatable menu 610 in the opposite direction (i.e., to the right, or clockwise).

Figure 7B:
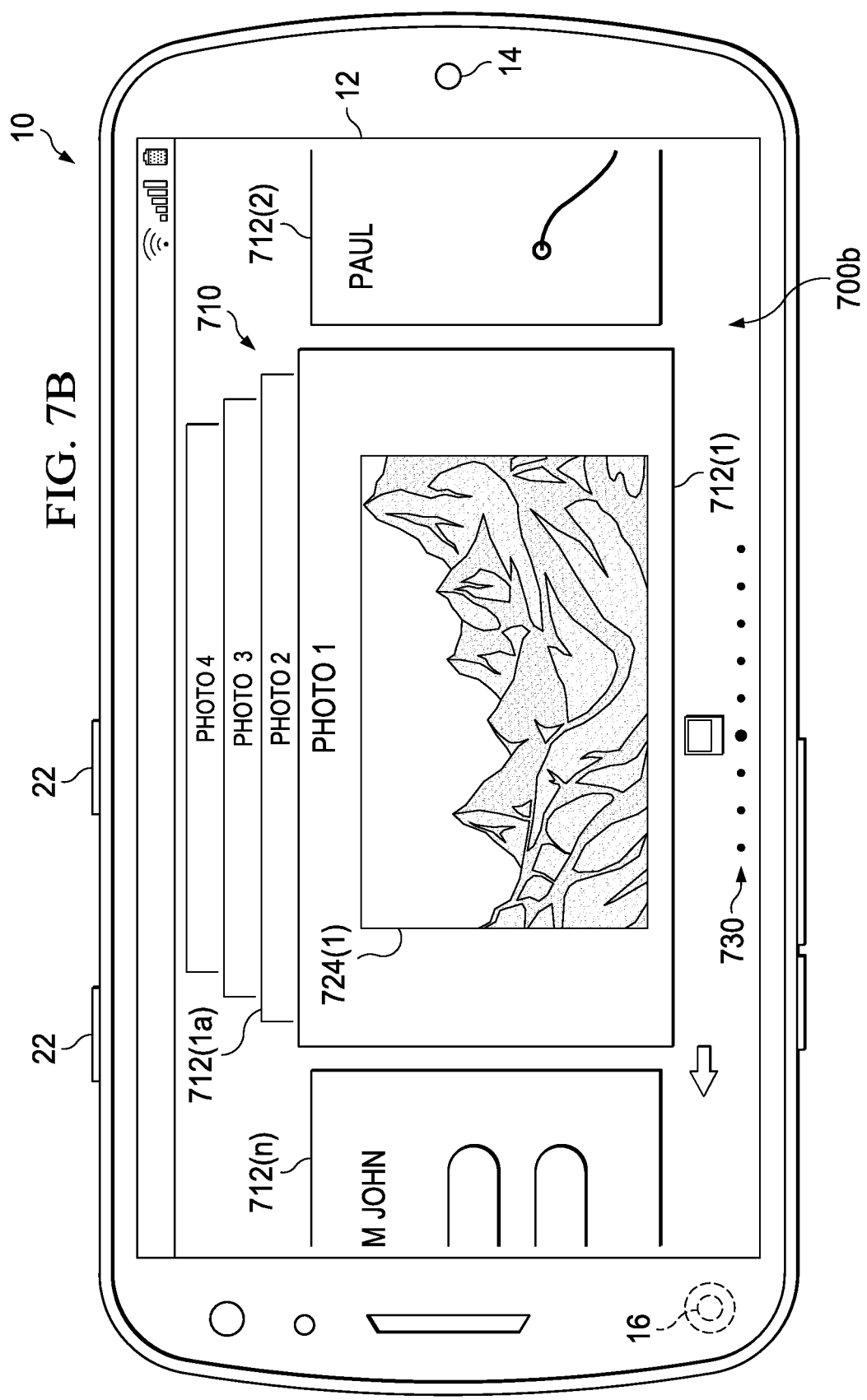

Turning to FIGS. 7A-7E, screenshots 700a-700e provide examples of zoomed-in views involving another possible rotatable menu of applications. FIG. 7A is a diagram of mobile device 10 with screenshot 700a in display 12. Screenshot 700a presents a zoomed-in view of another possible rotatable menu 710. The example zoomed-in view provides a graphical representation, displayed in content card 712(1), of a photo library generated by a photograph application that may be running in the foreground of mobile device 10. In at least one example, in the zoomed-out view, content card 712(1) (positioned between content cards 712(2) and 712(n) in rotatable menu 710) was displayed in the center location of rotatable menu 710. Thus, when an end user zoomed-in on the zoomed-out view of rotatable menu 710, the photograph application, or a portion thereof, began running in the foreground of mobile device 10. The photograph application may be configured to display its objects (e.g., photograph albums, photographs, etc.) in a location defined for content card 712(1) in the zoomed-in view. In this example scenario, a July 2012 Yosemite album is displayed with photographs 724(1)-724(18) in content card 712(1). Other albums may be layered in a set of one or more content cards behind content card 712(1). The photograph application may be adapted to allow the end user to interact by navigating deeper into views of other photograph albums/folders (e.g., Portland-June 2012, New York-June 2012, France-May 2012), for example, by scrolling vertically through the layered content cards. Additionally, a menu control element 730 is presented as a task bar. A zoomed-out view of rotatable menu 710 could be requested by an end user, for example, by interacting with menu control element 730.

FIG. 7B is a diagram of mobile device 10 with screenshot 700b in display 12. Screenshot 700b presents another zoomed-in view of rotatable menu 710. In FIG. 7B, a graphical representation, displayed in content card 712(1), of layered individual photographs is presented, with photograph 724(1) in content card 712(1) displayed in a top layer. This view may be the result of interaction by an end user with the view of screenshot 700a in FIG. 7A. The photograph application may allow an end user to zoom-in on individual photographs and to navigate the photographs individually, in a set of layered content cards, as illustrated in screenshot 700b. The graphical representation of individual photographs in content cards layered behind content card 712(1) may be adapted to allow an end user to navigate deeper into the other photographs, such as Photo 2 in a content card 712(1a), by appropriate input (e.g., vertically swiping the display).

FIG. 7C is a diagram of mobile device 10 with screenshot 700c in display 12. Screenshot 700c presents another zoomed-in view of rotatable menu 710. In FIG. 7C, a user may select a particular photograph, for example photograph 724(2) in content card 712(1a), after navigating through individual photographs in layered content cards as shown in FIG. 7B. The end user may desire to send the particular photograph to someone in an email, text the photograph, post the photograph on a social media website, etc. In at least one embodiment, the end user can touch and hold the display to select the desired photograph (top layer photograph). In at least some embodiments, menu control element 730 may not be continuously displayed and holding down the photograph (or other object) may reveal menu control element 730. The user may then drag the photograph toward menu control element 730.

FIG. 7D is a diagram of mobile device 10 with screenshot 700d in display 12. Screenshot 700d presents another zoomed-in view of rotatable menu 710, with a zoomed-out view of another rotatable menu 750 overlaying the zoomed-in view. In FIG. 7D, a user has dragged selected photograph 724(2) to hover over menu control element 730. As the end user holds photograph 724(2) over menu control element 730, a zoomed-out view of rotatable menu 750 overlays the zoomed-in view of rotatable menu 710, and includes a set of content cards 752(1)-(m) that are contextually relevant to the foreground application, which is the photograph application in this scenario. A desired application may be selected by the end user from rotatable menu 750 (or possibly from menu control element 730). Thus, the end user may transition directly into the desired application with selected photograph 724(2). In some cases, rotatable menu 750 may be configured with only contextually relevant content cards and, therefore, may have less content cards than a rotatable menu for an entire application library of the mobile device (e.g., gaming applications may not be placed in a contextually relevant rotatable menu for a photograph application). In other embodiments, rotatable menu 750 may be the same as rotatable menu 710, which could include a set of content cards representing an entire application library of the mobile device, but with contextually relevant content cards being adjacent to each other. In the example scenario of FIG. 7D, the contextually relevant content cards represent an email application, texting application, photograph application, social media application, and music application, which could be configured with capabilities to perform one or more actions on a photograph.

Figure 7E:
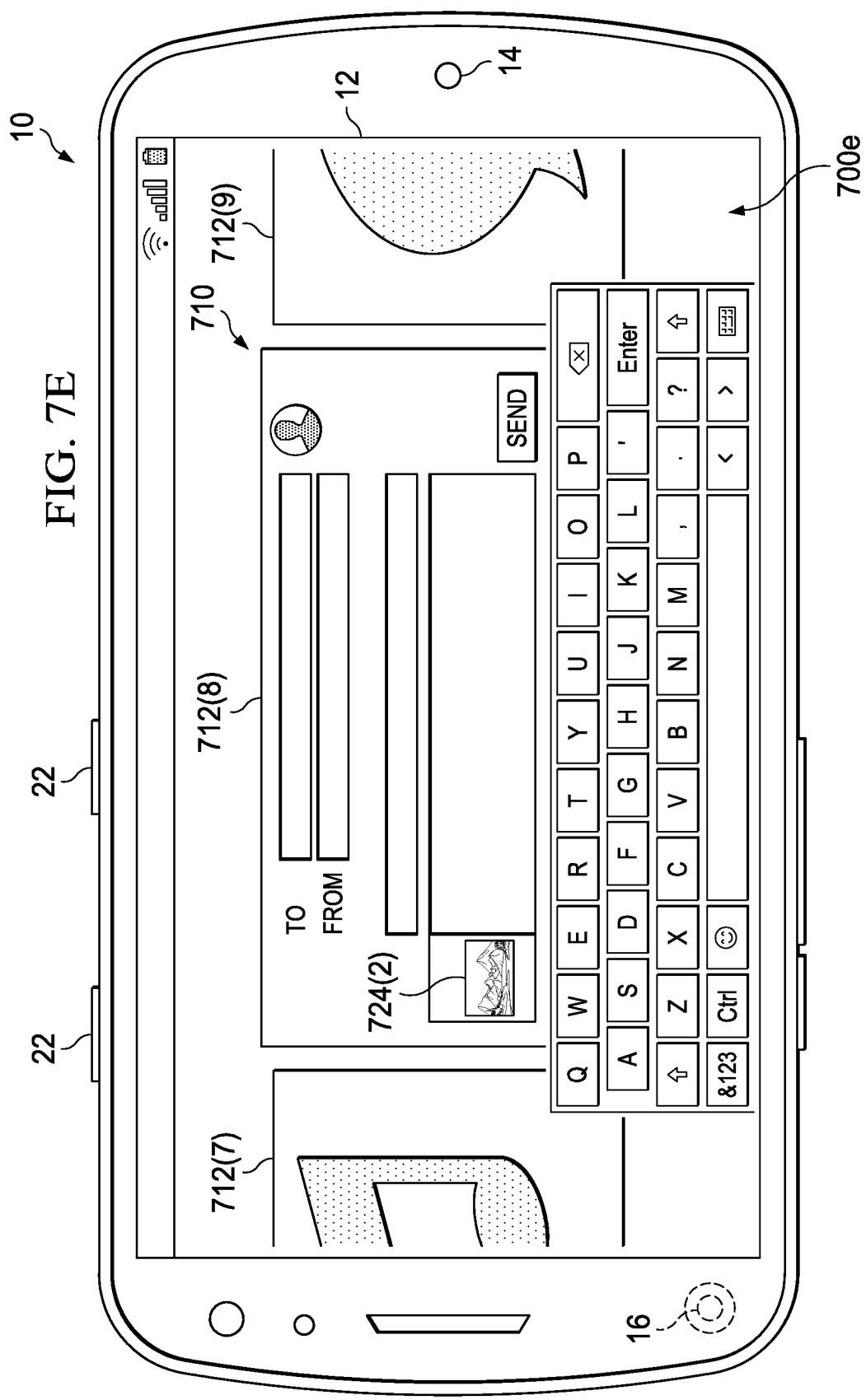

FIG. 7E is a diagram of mobile device 10 with screenshot 700e in display 12. Screenshot 700e presents another zoomed-in view of rotatable menu 710, where the end user has transitioned to another application represented in rotatable menu 710. In screenshot 700e, rotatable menu 710 has been rotated so that an email application is running in the foreground and provides a graphical representation in content card 712(8) of an interactive screen for composing an email. Photograph 724(2), which was selected by the end user, as shown in screenshot 700d of FIG. 7D, may be automatically inserted as an attachment in the email message. Once the end user is finished with the email application, she may simply rotate rotatable menu 710 back to the photograph content card 712(1), as previously described herein, or to some other content card.

Figure 8B:
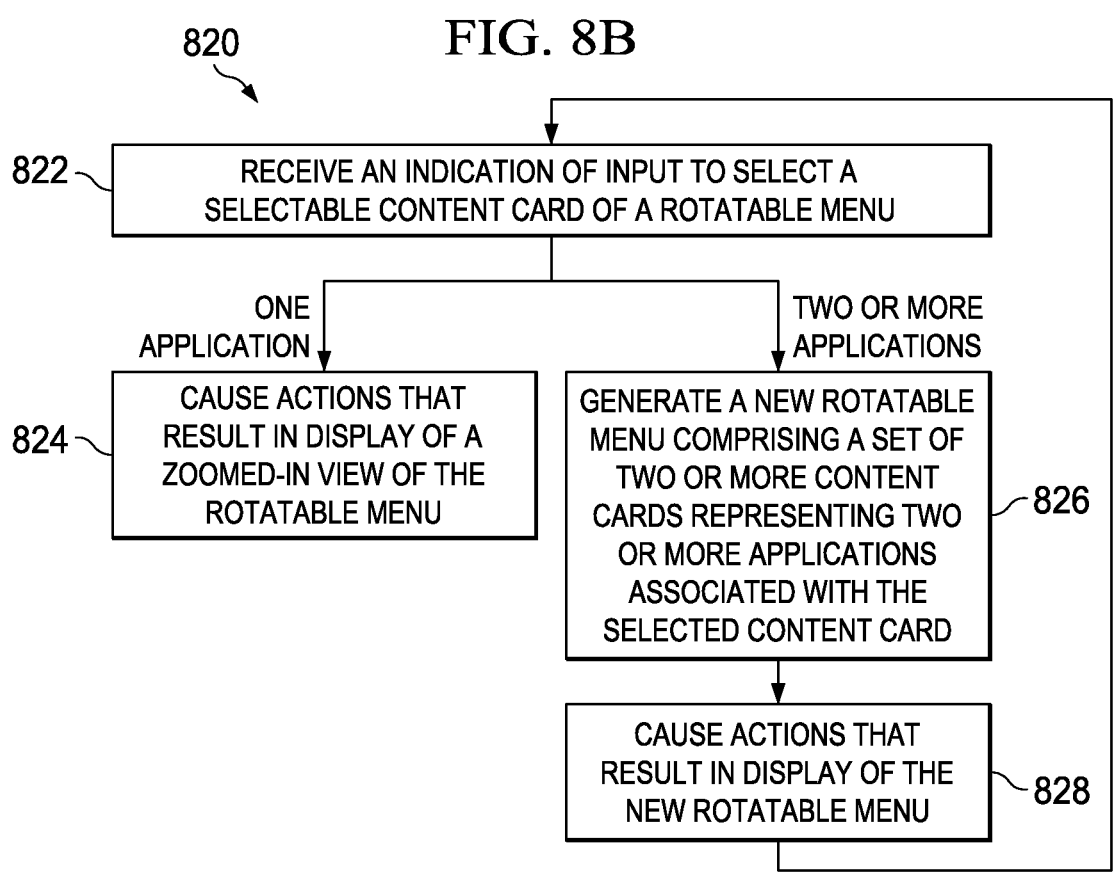

FIGS. 8A through 8B are simplified flowcharts 800 and 820, respectively, illustrating activities associated with menu management and application navigation using a rotatable menu of applications, according to at least one embodiment. One or more sets of operations may correspond to the activities of FIGS. 8A and 8B. A computing device, such as mobile device 10, or a portion thereof, may utilize the set of operations. In an embodiment, menu manager 64 of mobile device 10 may perform at least some of the operations.

At 802, a computing device receives a request to display a rotatable menu of applications of the computing device. The request could result from input by an end user. In at least one embodiment, the request could result from the computing device powering on or starting again after being asleep. At 804, the computing device generates the rotatable menu comprising a set of content cards representing the applications. In at least one embodiment, the set of content cards includes one or more content cards, and at least one of the content cards represents at least one of the applications in the computing device. At 806, the computing device provides the rotatable menu in a first orientation. A first orientation can include a selectable content card in a particular place in the rotatable menu, such as a front and center location of the rotatable menu. In at least one embodiment, other content cards that are visible when the rotatable menu is in the first orientation may also be selectable. At 808, the rotatable menu can be displayed on the computing device (e.g., on a display of the computing device).

At 810, the computing device may receive an indication of input to rotate the displayed rotatable menu. In at least one embodiment, the input could be an end user horizontally swiping the display in a desired rotational direction. At 812, the computing device may rotate the rotatable menu to a second orientation. In the second orientation, a different content card may be selectable and may be displayed in the same place in the rotatable menu as the previous selectable content card. At 814, the computing device may cause actions that result in the display of the rotatable menu in the second orientation.

In FIG. 8B, flowchart 820 illustrates potential activities that may occur when a rotatable menu is displayed on a display of a computing device. At 822, the computing device receives an indication of input to select a selectable content card of a rotatable menu displayed on the computing device. In at least one embodiment, an end user may press and hold or tap one or more times on the selectable content card in order to select it. If the selected content card represents a single application, then at 824, the computing device may cause actions that result in the display of a zoomed-in view of the rotatable menu. If the selected content card represents two or more applications, then at 826, the computing device can generate a new rotatable menu including a set of two or more content cards representing two or more applications associated with the selected content card. At 828, the computing device may cause actions that result in display of the new rotatable menu. Flow can pass back to 822, as an end user may select a selectable content card from the new rotatable menu.

Turning to FIGS. 9A through 9I, diagrams of mobile device 10 with display 12 illustrate various screenshots as examples of graphical user interfaces (GUIs) according to embodiments disclosed herein. Generally, the screenshots present views of a split screen menu of applications and of results of interactions involving the split screen menu. In at least some embodiments, the mobile device can display the split screen menu (and other graphical views) on a touch-sensitive display and an end user can interact with the split screen menu by touching the touch-sensitive display with a finger or stylus, for example, using appropriate gestures (e.g., swiping, tapping, touching and holding, etc.). In at least one embodiment, a finger gesture can include a single-finger or multi-finger gesture. The interaction can include input from the end user and an indication of the input can be provided to menu manager 64. Input can be in the form of data or signals (e.g., selections, commands, requests, etc.).

Figure 9A:
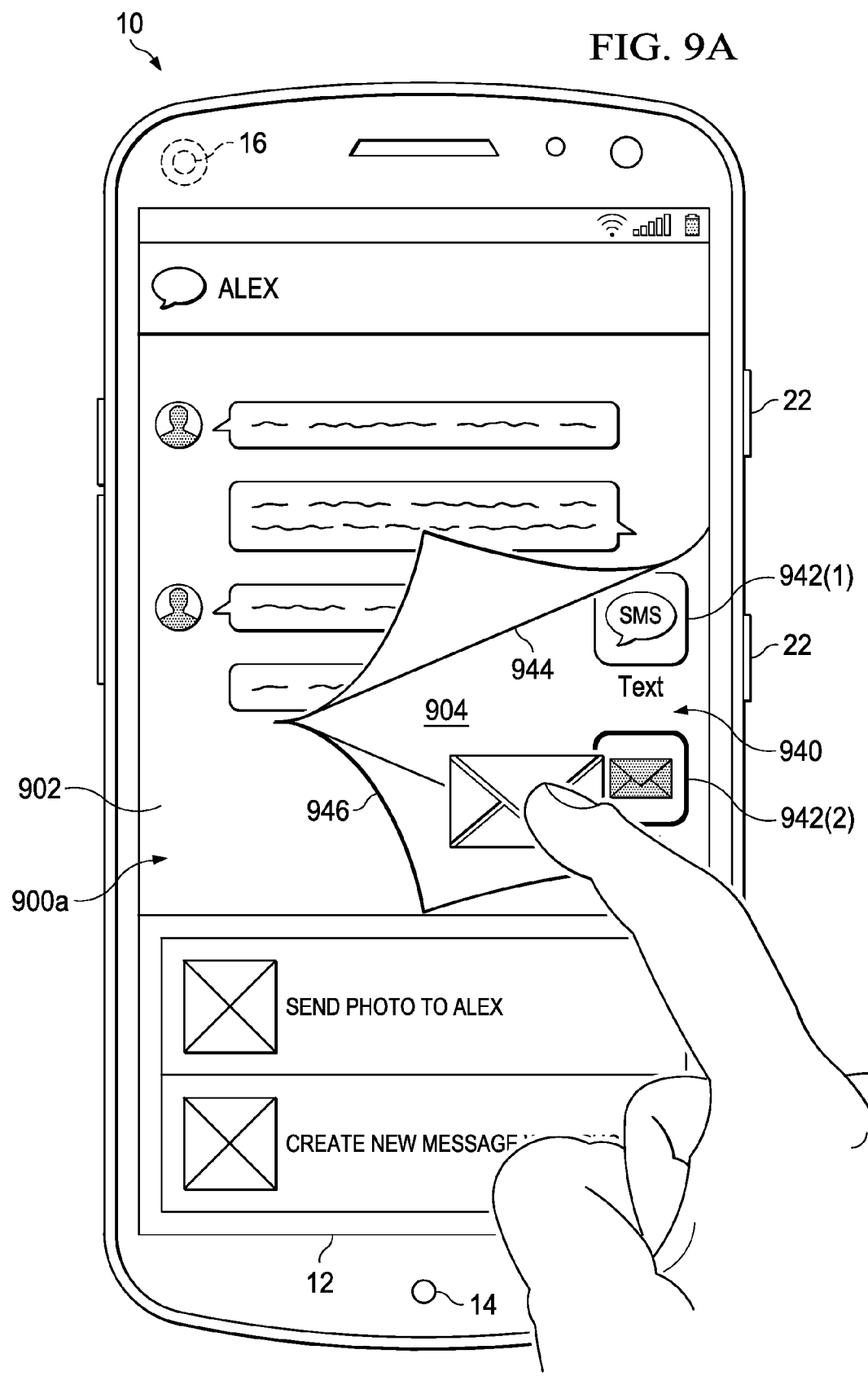

FIG. 9A illustrates screenshot 900a as an example of a possible view involving a split screen menu of applications 940 according to at least one embodiment. Views, which are made up of graphical elements that can be provided by applications, may be displayed in layers in display 12. A top layer (e.g., top layer 902) may be visible to an end user via display 12. In some instances, layers, or portions of layers may be modified to be transparent such that one or more lower layers (e.g., lower layer 904) are revealed. Screenshot 900a presents a view of a text message, which is defined by one or more graphical elements that may be provided by a text messaging application running in the foreground of mobile device 10, and which is displayed in a top layer 902 of a graphical user interface of display 12. Screenshot 900a also presents a view of split screen menu 940, which may be provided in a lower layer 904 of the graphical user interface of display 12. Split screen menu 940 may include a set of display elements 942(1) and 942(2) (and possibly others not shown) that each represent at least one application in mobile device 10. Thus, navigation lives beneath the content (i.e., top layer 902) allowing quick switching between applications.

In at least one embodiment, an end user can request a split screen menu by appropriate interaction with display 12. In at least one embodiment, appropriate interaction includes touching, with a finger or stylus for example, a left or right edge of display 12, and swiping inward (i.e., touching a right edge and swiping toward the left edge, touching the left edge and swiping toward the right edge). This interaction may cause the foreground application (e.g., the text messaging application) to pause, or run in the background temporarily. The view of the text message displayed in top layer 902 is modified to form an image of the view being split horizontally to create split edges 944 and 946. Split edges 944 and 946 appear to be pulled or rolled back to reveal lower layer 904 of the graphical user interface. In lower layer 904, a view of a menu including display elements 942(1) and 942(2) (and possibly others not shown) can be displayed, to provide access to other applications represented by the display elements. In at least one embodiment, the split screen can be seen in either a portrait orientation (i.e., as shown in FIG. 9A) or in a landscape orientation (as shown in FIGS. 9B-9I).

Figure 9B:
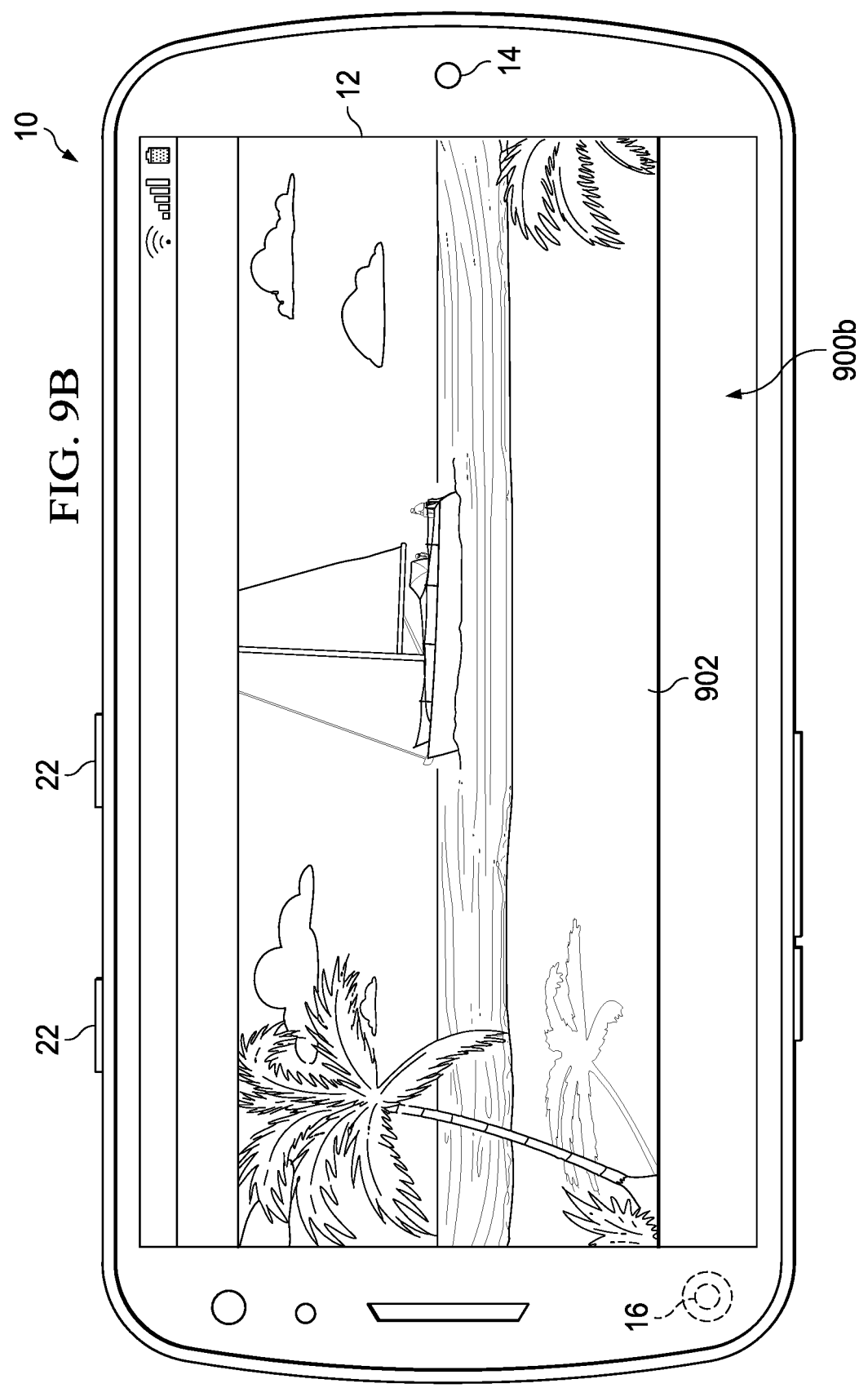

In FIGS. 9B-9I, screenshots 900b-900i are provided as examples of possible views involving a split screen menu of applications. In FIG. 9B, screenshot 900b illustrates an example movie being provided in top layer 902 of a graphical user interface by a movie application that may be running in the foreground of mobile device 10. Top layer 902 is provided as an outermost layer of the graphical user interface that is visible to an end user in display 12.

FIG. 9C is a diagram of mobile device 10 with screenshot 900c in display 12. Screenshot 900c presents a possible resulting view in display 12 after an end user provides appropriate interaction to request a split screen menu. As shown in screenshot 900c, an end user may use a finger to swipe from a left edge to a right edge of display 12. This interaction may cause the movie application to pause, and to begin running in the background. The view of the movie is modified by being horizontally split and resulting split edges 914 and 916 being rolled up and down, respectively, to reveal lower layer 904. In lower layer 904, a view of a split screen menu 910 may be provided with display elements 912(1)-(6), for example. In at least one example, the view in lower layer 904 of the graphical user interface may be adapted to allow the end user to scroll through display elements 912 if not all of display elements 912 fit within the portion of lower layer 904 that is visible in display 12 to the end user. Thus, split screen menu 910 could grow larger to display more display elements representing more applications.

In at least one embodiment, split screen menu 910 may not include display elements representing all applications on mobile device 10. Instead, split screen menu 910 may include a set of display elements contextually related to the application corresponding to the view in top layer 902, which is a movie application in this example scenario. In at least some embodiments, the split screen menu 910 may not necessarily include only applications that are contextually related to a current application. Rather, split screen menu 910 could include a set of display elements representing the most commonly used applications by the user. Thus, the end user is provided with quick access to the most commonly used and/or contextually related applications at any time while interacting with her phone. Furthermore, as previously described herein, embodiments may provide an end user with the ability to configure contextual rules regarding which applications to consider contextually relevant or which applications to designate as favorite (or most commonly accessed) applications, to be displayed in a split screen menu.

FIG. 9D is a diagram of mobile device 10 with screenshot 900d in display 12. Screenshot 900d presents a possible resulting view in display 12 after an end user provides appropriate interaction to request more information from split screen menu 910. As shown in screenshot 900d, an end user may use a finger to slide from a left edge of lower layer 904 on display 12 toward a right edge of display 12. This interaction causes the view of split screen menu 910 to be modified by being horizontally split and resulting split edges 926 and 928 being rolled up and down, respectively, to reveal a lowest layer 906. In lowest layer 906, a view of a split screen menu 920 may be provided with display elements, such as 922(1) and 922(2), for example. In at least one embodiment, split screen menu 920 may include a set of display elements representing all, or substantially all, applications on mobile device 10. In an example implementation, display elements 922(1)-(2) (and others not shown) may be listed in alphabetical order, or any other arrangement, which could be configured by the end user. In at least one example, lowest layer 906 of the graphical user interface may be adapted to allow the end user to scroll through display elements if not all of the display elements fit within the portion of lowest layer 906 that is visible in display 12 to the end user. Thus, the end user is provided with quick access to any application on mobile device 10 at any time while interacting with the mobile device.

FIG. 9E is a diagram of mobile device 10 with screenshot 900e in display 12. Screenshot 900e illustrates a view of an example photograph library provided in a top layer 902 of a graphical user interface by a photograph application that may be running in the foreground of mobile device 10. The photograph library may include multiple objects, for example, photographs 924(1)-(44).

FIG. 9F is a diagram of mobile device 10 with screenshot 900f in display 12. Screenshot 900f presents another view of the photograph library of FIG. 9E. In FIG. 9F, an end user selects a particular photograph, for example, 924(1). The end user may want to send the particular photograph to someone in an email, text the photograph, post the photograph on a social media website, etc. In at least one embodiment, the view of the photograph library is adapted to allow the end user to touch and hold display 12 with a finger or stylus, for example, to select the desired photograph displayed in top later 902. The end user may then drag the photograph toward one of the side edges of display 12.

Figure 9G:
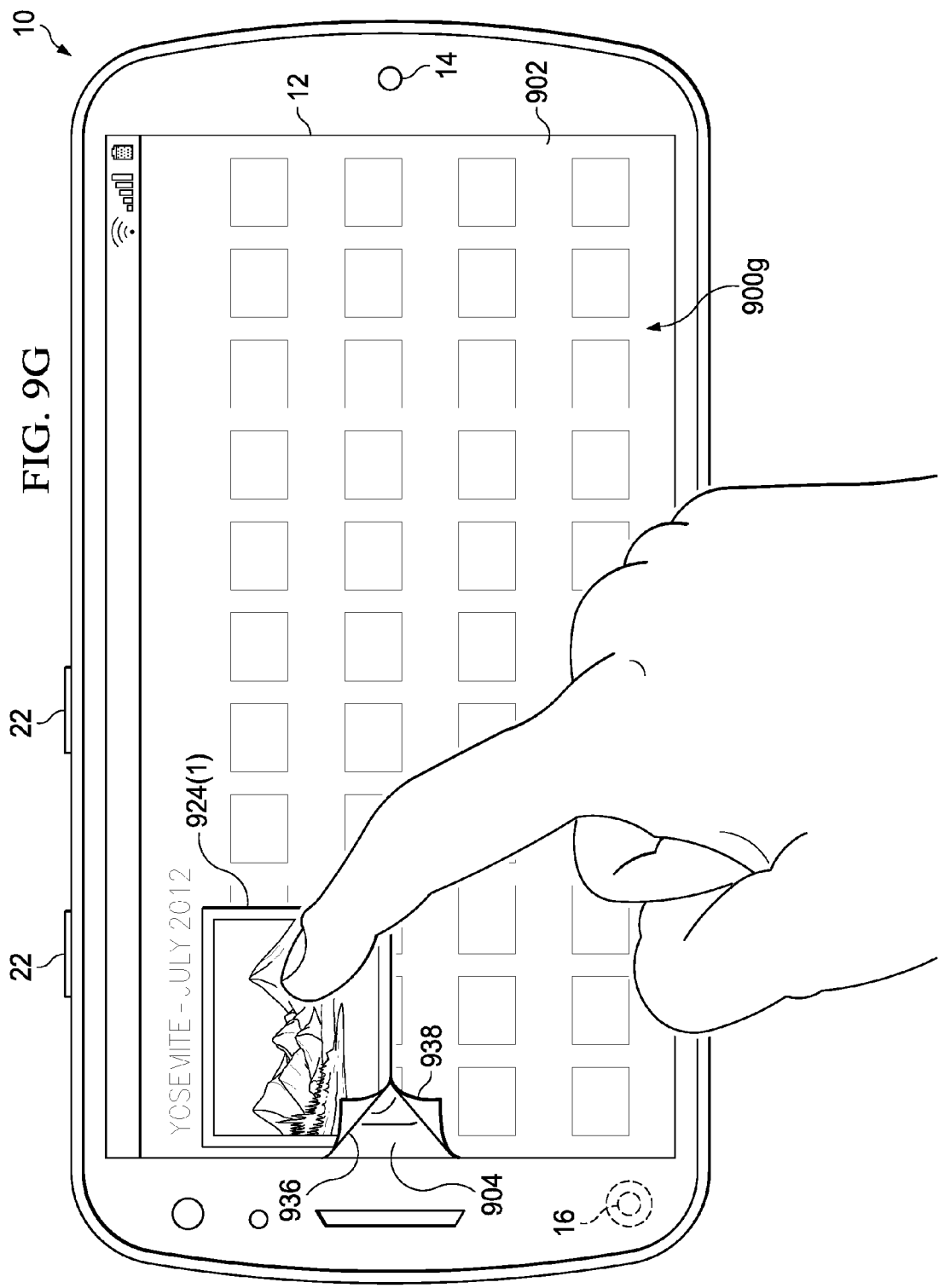

FIG. 9G is a diagram of mobile device 10 with screenshot 900g in display 12. Screenshot 900g illustrates the end user dragging photograph 924(1) (of FIG. 9F) over to a left edge of display 12. As mobile device 10 detects the interaction by the end user, the view of the photograph library may be modified by being horizontally split and resulting split edges 936 and 938 being slightly rolled or pulled back to reveal lower layer 904.

FIG. 9H is a diagram of mobile device 10 with screenshot 900h in display 12. Screenshot 900h illustrates the end user dragging photograph 924(1) (of FIG. 9G) back from the left edge of display 12 toward the right edge of display 12, such that split edges 936 and 938 of the view in top layer 902 continue to roll back to reveal lower layer 904. A view of split screen menu 930 including display elements 932(1)-(2) (and possibly others not shown) may be displayed in lower layer 904. In at least one embodiment, only contextually relevant display elements may be displayed in lower layer 904, when the end user is multitasking or sharing objects between applications. For example, contextually relevant display elements for the photograph application could represent an email application, a text messaging application, a social media website, etc., which could be configured with capabilities to perform one or more actions on a photograph.

Figure 9I:
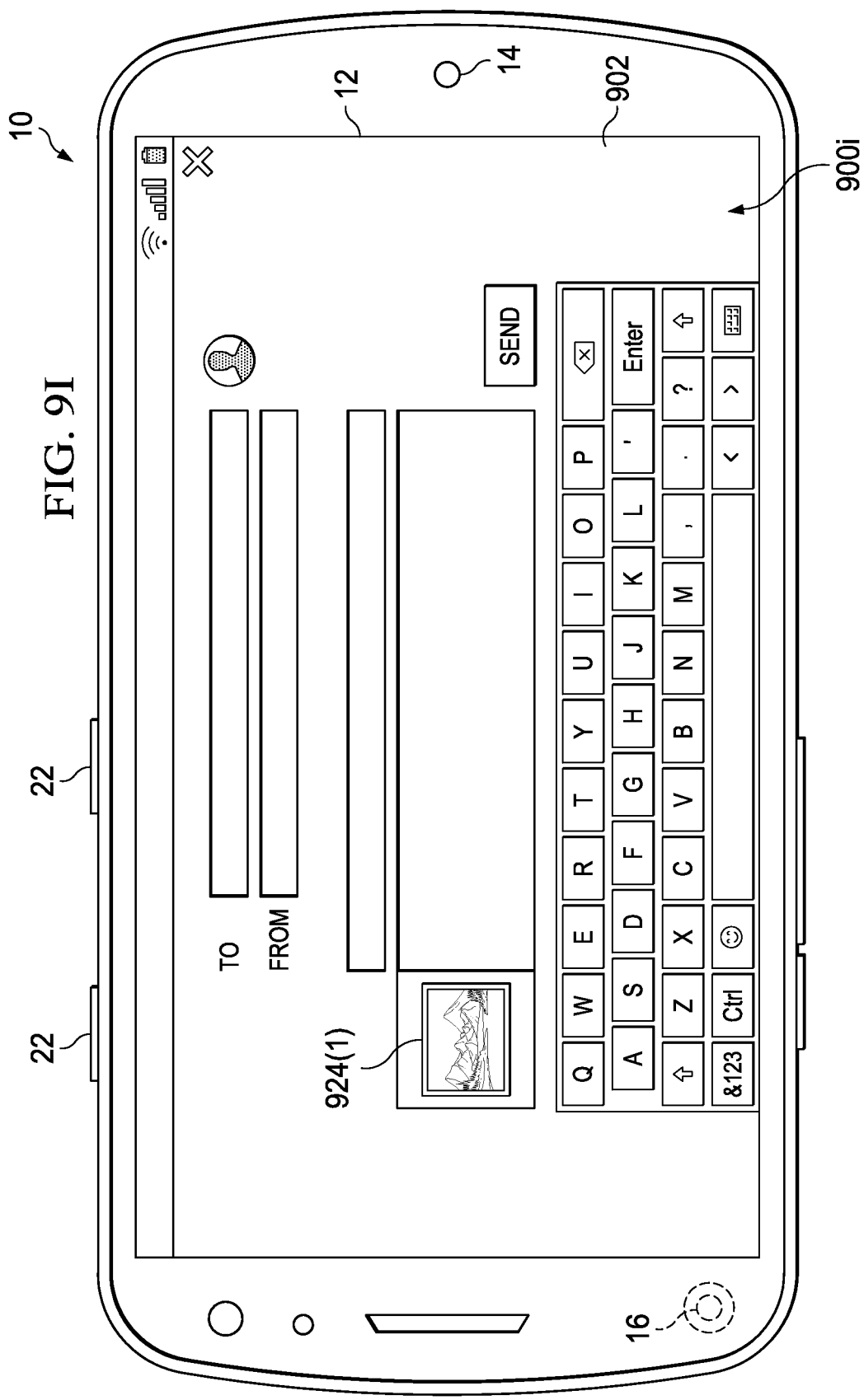

FIG. 9I is a diagram of mobile device 10 with screenshot 900i in display 12. Screenshot 900i presents a view of an interactive screen in top layer 902 for composing an email. Photograph 924(1), which was selected by the end user, as shown in screenshots 900e-900h of FIGS. 9E-9H, may be automatically inserted as an attachment in the email. Thus, at least one embodiment of a split screen menu enables one touch task handling across multiple applications. Once the end user is finished with the email application, she may simply interact with mobile device 10 again, by swiping from an edge of display 12 in order to reveal a split screen menu in lower layer 904. The end user may then bring a desired application to the foreground by selecting a display element representing the desired application.

FIG. 10 is a simplified flowchart 1000 illustrating activities associated with menu management and application navigation using a split screen menu of applications, according to at least one embodiment. One or more sets of operations may correspond to the activities of FIG. 10. A computing device, such as mobile device 10, or a portion thereof, may utilize the set of operations. In an embodiment, menu manager 64 of mobile device 10 may perform at least some of the operations.

At 1002, a computing device receives an indication of input to request a menu of applications on the computing device. The request could result from input by an end user. In at least one embodiment, the input could include the end user using a finger or other suitable item (e.g., a stylus), to swipe horizontally across a display of the computing device.

At 1004, the computing device generates the menu comprising a first set of display elements representing the applications. In at least one embodiment, the first set of display elements includes one or more display elements, and at least one of the display elements represents at least one application in the computing device. At 1006, the computing device causes actions that result in a modification of a top layer view in a display of the computing device to reveal a lower layer view that includes the menu. The top layer view could include graphical elements provided by a current application (e.g., game, movie, photographs, weather, maps, etc.). The modification could include the top layer view having an appearance of being at least partially split with the opposing split edges rolled back to reveal the lower layer view.

If the computing device receives another indication of input at 1008, to request a new menu of applications on the device, then at 1010, the computing device may generate the new menu including a second set of display elements representing applications of the new menu. In at least one embodiment, the second set of display elements represents more applications in the computing device than the first set of display elements. For example, the second set of display elements could potentially represent all, or substantially all, applications available to an end user on the computing device, which is essentially a home screen of display elements. At 1012, the computing device may cause actions that result in modification of the lower layer view in the display to reveal a bottom layer (or lowest layer) view that includes the new menu. The modification could include the lower layer view having an appearance of being at least partially split with the opposing split edges rolled back to reveal the bottom (or lowest) layer view. The modified lower layer view may appear to be split within the modified top layer view, which is also split.

With reference again to 1006, once the top layer view is split to reveal a lower layer view that includes the menu, the computing device may receive at 1014, an indication of input to select one of the display elements in the menu. In at least one embodiment, an end user may press and hold or tap one or more times on the desired display element in order to select it. If the user selects a display element and the indication of input is received by the computing device, then at 1016, the computing device may cause actions that result in the display of a new top layer view of graphical elements generated, or otherwise provided, by an application represented by the selected display element.

The examples described herein, with respect to both a split screen menu embodiment and a rotatable menu embodiment, are for illustrative purposes only in order to clarify and teach the broad concepts of the embodiments. For example, a photograph is an object of an application that may be provided from one application to another application according to embodiments herein. However, other objects of other applications (e.g., contacts, phone numbers, files, music, videos, etc.) may also be shared between applications in accordance with embodiments herein. Moreover, the applications selected in the preceding FIGURES are merely representative of the myriad of other applications available for mobile devices that may be integrated into embodiments disclosed herein and displayed and accessed using a rotatable menu or a split screen menu.

Figure 11:
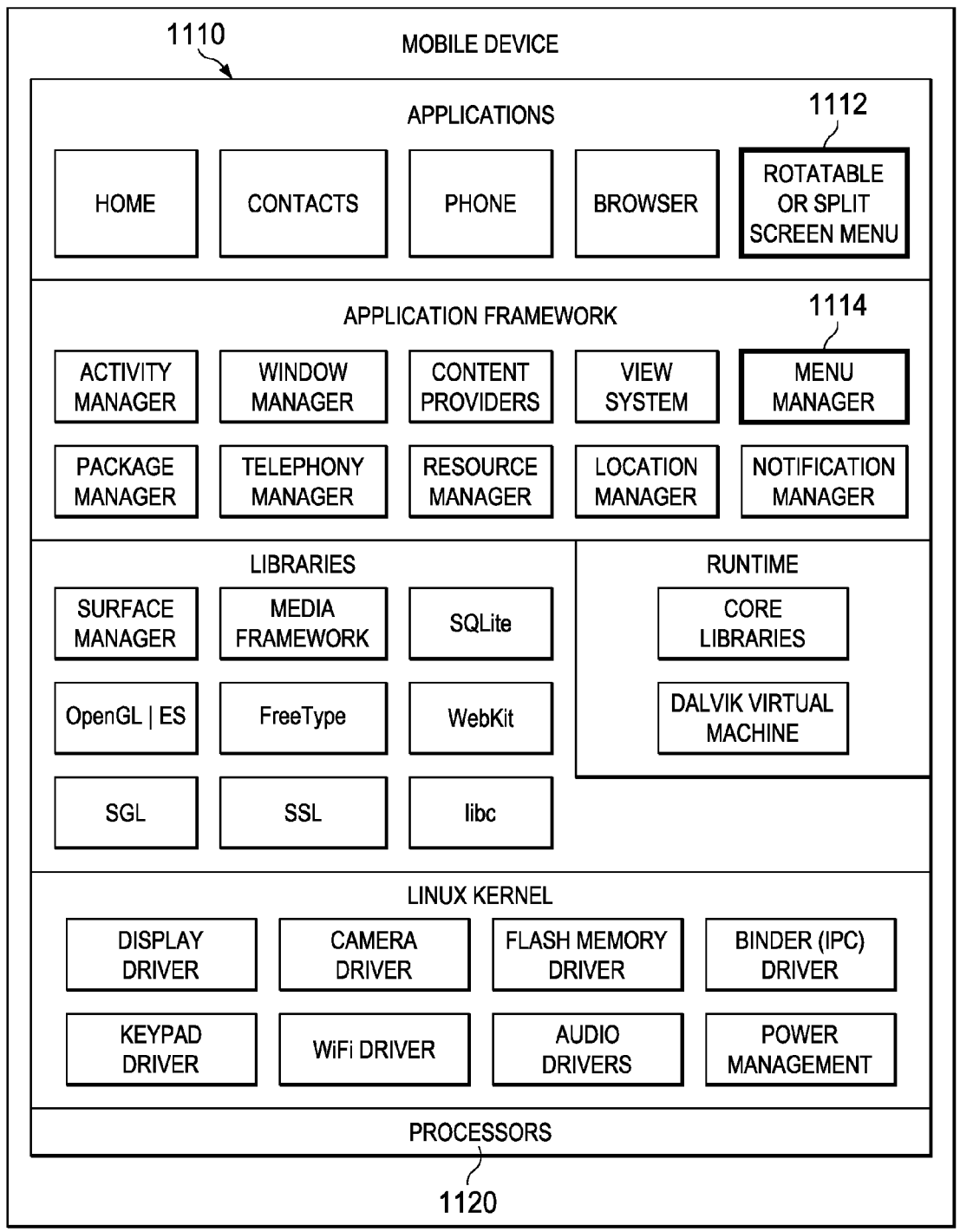
FIG. 11 is a simplified block diagram illustrating an example architecture associated with a mobile device.

FIG. 11 is a simplified schematic diagram of a mobile device generally indicated at 1110. More specifically, FIG. 11 illustrates a modified architecture diagram associated with an operating system of the mobile device. A number of applications are provided in this particular example (e.g., a rotatable or split screen menu 1112). In addition, an application framework is also illustrated that includes a menu manager 1114. In addition, a number of libraries are illustrated, along with a runtime module and a Linux™ kernel.

In one potential implementation, a given mobile device OS architecture is changed in order to accommodate the features of the present disclosure. For example, the modified architecture of FIG. 11 can be reflective of an Android™ architecture that includes modules such as menu manager 1114, rotatable or split screen menu 1112, etc. In at least one embodiment, rotatable menus and split screen menus are mutually exclusive and menu application 1112 and menu manager 1114 may be configured for either an embodiment offering rotatable menus or an embodiment offering split screen menus.

Menu manager 1114 can, in some embodiments, be provisioned at the application framework level since it can interact with other modules in the application framework (e.g., such as the Window Manager™ and Package Manager), and libraries such as Surface Manager, for example. In operation, menu manager 1112 may be responsible for creating either rotatable menus or split screen menus for a mobile device, depending on the particular embodiment, as shown and described herein. An end user may provide preference information, for example, in the form of preferred context groupings, which can be used to determine which content cards (for a rotatable menu embodiment) or display elements (for a split screen menu embodiment) are to be displayed when such menus are accessed from a particular current application. For example, an end user may provide preferences for her most commonly accessed applications (e.g., weather, email, text messaging, social media) which can be displayed in a split screen menu or in a rotatable menu, depending on the particular embodiment. In another example, context groupings may be preconfigured by default, configured by an end user, based on certain criteria (e.g., user's behavior), or any combination thereof. In some embodiments, a context grouping may include applications that are capable of receiving an object of a current application as input and performing an action on the object. An example of contextual configuration in a rotatable menu embodiment could include displaying a rotatable menu with content cards representing applications for text messaging, emailing, and social media when a rotatable menu is accessed from a current (i.e., running in the foreground) photograph application. Similarly, an example of contextual configuration in a split screen menu embodiment could include displaying a split screen menu with display elements (e.g., icons) representing applications for text messaging, emailing, and social media when a split screen menu is accessed from a current photograph application.

It should be noted that most mobile OSes (including the Android™ framework) leave applications running in the background when a user moves back to the home screen. However, the application at that time typically has no visual components and, further, uses less memory, although the process continues to run unless the device is running out of memory. For this reason, one potential implementation of the rotatable menu embodiment is based on the notion of presuming that such applications are running in the background concurrently. In some implementations, the OS can allow an application to update its corresponding content card (e.g., weather update) in order to present the updated content cards on a rotatable menu.

Turning to the example infrastructure associated with the present disclosure, the term 'end user' is used interchangeably with 'mobile devices' and 'computing devices' and these terms are inclusive of any type of computer or apparatus that can execute an application. This would include any type of receiver, a computer, a desktop, a laptop, an Internet appliance, a mobile Internet device, a set-top box, an Internet radio device (IRD), a cell phone, a smart phone, a tablet, a personal digital assistant (PDA), a Google Android™, an iPhone™, an iPad™, a Microsoft Surface™, Google Nexus™, or any other device, component, element, endpoint, or object capable of initiating voice, audio, video, media, or data exchanges within communication system 50. Such devices may also be inclusive of a suitable interface to the human user, such as a display, a keyboard, a touchpad, a touch screen (including a multi-touch screen), a remote control, or any other terminal equipment. Such computing devices may also be any device that seeks to initiate a communication on behalf of another entity or element, such as a program, a database, or any other component, device, element, or object capable of initiating an exchange within communication system 50. Data, as used herein in this document, refers to any type of numeric, voice, video, media, audio, or script data, or any type of source or object code, or any other suitable information in any appropriate format that may be communicated from one point to another.

In general terms, the computing devices can facilitate the menu management and navigation activities discussed herein. These computing devices may include any suitable hardware, software, firmware, components, modules, interfaces, or objects that facilitate the operations thereof. This may be inclusive of appropriate algorithms and communication protocols that allow for the effective exchange of data or information. In one implementation, the computing device includes software to achieve (or to foster) the menu management and navigation activities discussed herein. Additionally, each of these computing devices can have an internal structure (e.g., a processor, a memory element, etc.) to facilitate at least some of the operations described herein. In other embodiments, these menu management and navigation activities may be executed externally to these devices (e.g., in the cloud, etc.), or included in some other computing device to achieve the intended functionality. Alternatively, the computing devices may include software (or reciprocating software) that can coordinate with other computing devices in order to achieve the menu management and navigation activities described herein. In still other embodiments, one or several devices may include any suitable algorithms, hardware, software, firmware, components, modules, interfaces, or objects that facilitate the operations thereof.

In one example, each respective computing device can include software to achieve the menu management and navigation operations, as outlined herein in this document. In certain example implementations, the menu management and navigation functions outlined herein may be implemented by logic encoded in one or more tangible computer readable media (e.g., embedded logic provided in an application specific integrated circuit (ASIC), digital signal processor (DSP) instructions, software (potentially inclusive of object code and source code) to be executed by a processor, or other similar machine, etc.), which may be inclusive of non-transitory computer readable media. In some of these instances, a memory element can store data used for the operations described herein. This includes the memory element being able to store instructions (e.g., software, code, logic, etc.) that are executed to carry out the activities described in this Specification. The processor can execute any type of instructions associated with the data to achieve the operations detailed herein. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), a programmable read only memory (PROM), an erasable PROM (EPROM), an electrically erasable PROM (EEPROM)) or an ASIC that includes digital logic, software, code, electronic instructions, or any suitable combination thereof.

Any of these elements (e.g., the computing devices, the mobile devices, etc.) can include memory elements for storing information to be used in achieving the menu management and navigation activities, as outlined herein. Additionally, each of these devices may include a processor that can execute software or an algorithm to perform the menu management and navigation activities as discussed in this Specification. These devices may further keep information in any suitable memory element (random access memory (RAM), ROM, EPROM, EEPROM, ASIC, etc.), software, hardware, firmware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the computing devices can also include suitable interfaces for receiving, transmitting, and/or otherwise communicating data or information in a network environment.

Figure 12:
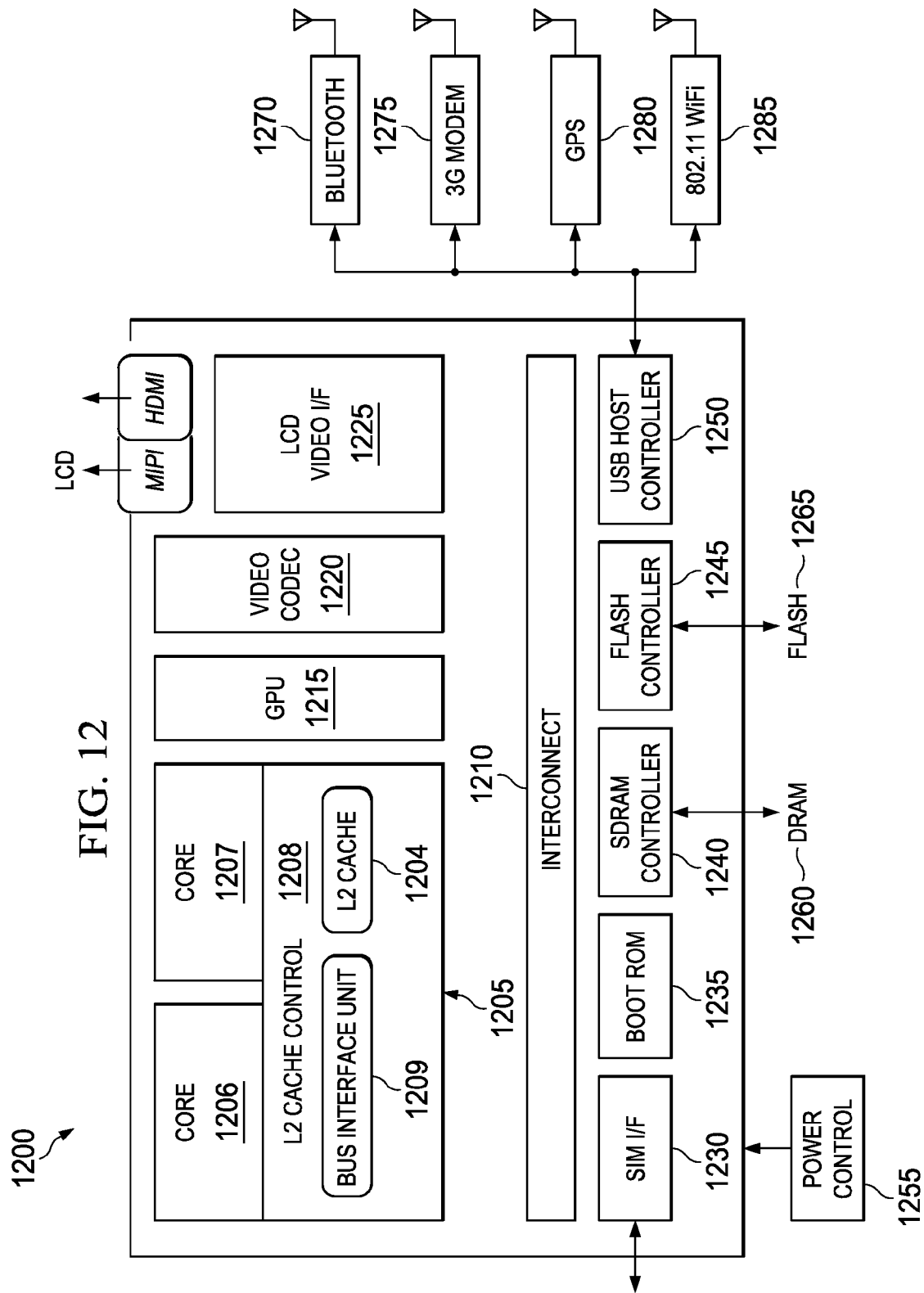
FIG. 12 is a simplified block diagram associated with an example ARM ecosystem system on chip (SOC) of the present disclosure.

FIG. 12 is a simplified block diagram associated with an example ARM ecosystem SOC 1200 of the present disclosure. At least one example implementation of the present disclosure includes an integration of the menu management and navigation features discussed herein and an ARM component. The example of FIG. 12 can be associated with any ARM core (e.g., A-9, A-15, etc.). Further, the architecture can be part of any type of mobile device or computing device including, but not limited to, a tablet, smartphone (inclusive of Android™ phones, i-Phones™), i-Pad™, Google Nexus™, Microsoft Surface™, personal computer, server, video processing components, laptop computer (inclusive of any type of notebook), Ultrabook™, any type of touch-enabled input device, etc.

In this example of FIG. 12, ARM ecosystem SOC 1200 may include multiple cores 1206-1207, an L2 cache control 1208, a bus interface unit 1209, an L2 cache 1204, a graphics processing unit (GPU) 1215, an interconnect 1210, a video codec 1220, and a liquid crystal display (LCD) I/F 1225, which may be associated with mobile industry processor interface (MIPI)/high-definition multimedia interface (HDMI) links that couple to an LCD.

ARM ecosystem SOC 1200 may also include a subscriber identity module (SIM) I/F 1230, a boot read-only memory (ROM) 1235, a synchronous dynamic random access memory (SDRAM) controller 1240, a flash controller 1245, a serial peripheral interface (SPI) master or USB host controller 1250, a suitable power control 1255, a dynamic RAM (DRAM) 1260, and flash 1265. In addition, one or more example embodiments include one or more communication capabilities, interfaces, and features such as instances of Bluetooth 1270, an nG modem 1275 (e.g., 3G, 4G, 5G, or any other cellular technology that may become available), a global positioning system (GPS) 1280, and an 802.11 WiFi 785 (i.e., Institute of Electrical and Electronics Engineers (IEEE) Std 802.11™-2012, published Mar. 29, 2012). These communication interfaces, and others not shown in FIG. 12, can enable communication by ARM core SoC 1200 through a variety of networks. These network environments can include, for example, wireless (e.g., IEEE 802.11), satellite, cellular (e.g., 3G, 4G, 5G, etc.), microwave, any other radio communications (e.g., Near Field Communications (NFC), etc.).

In operation, the example of FIG. 12 can offer processing capabilities, possibly along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX™, Linux™, Microsoft Windows Embedded™, Symbian™ and Ubuntu™, etc.). In at least one embodiment, the core processor may implement an out-of-order superscalar pipeline with a coupled low-latency level-2 cache.

Figure 13:
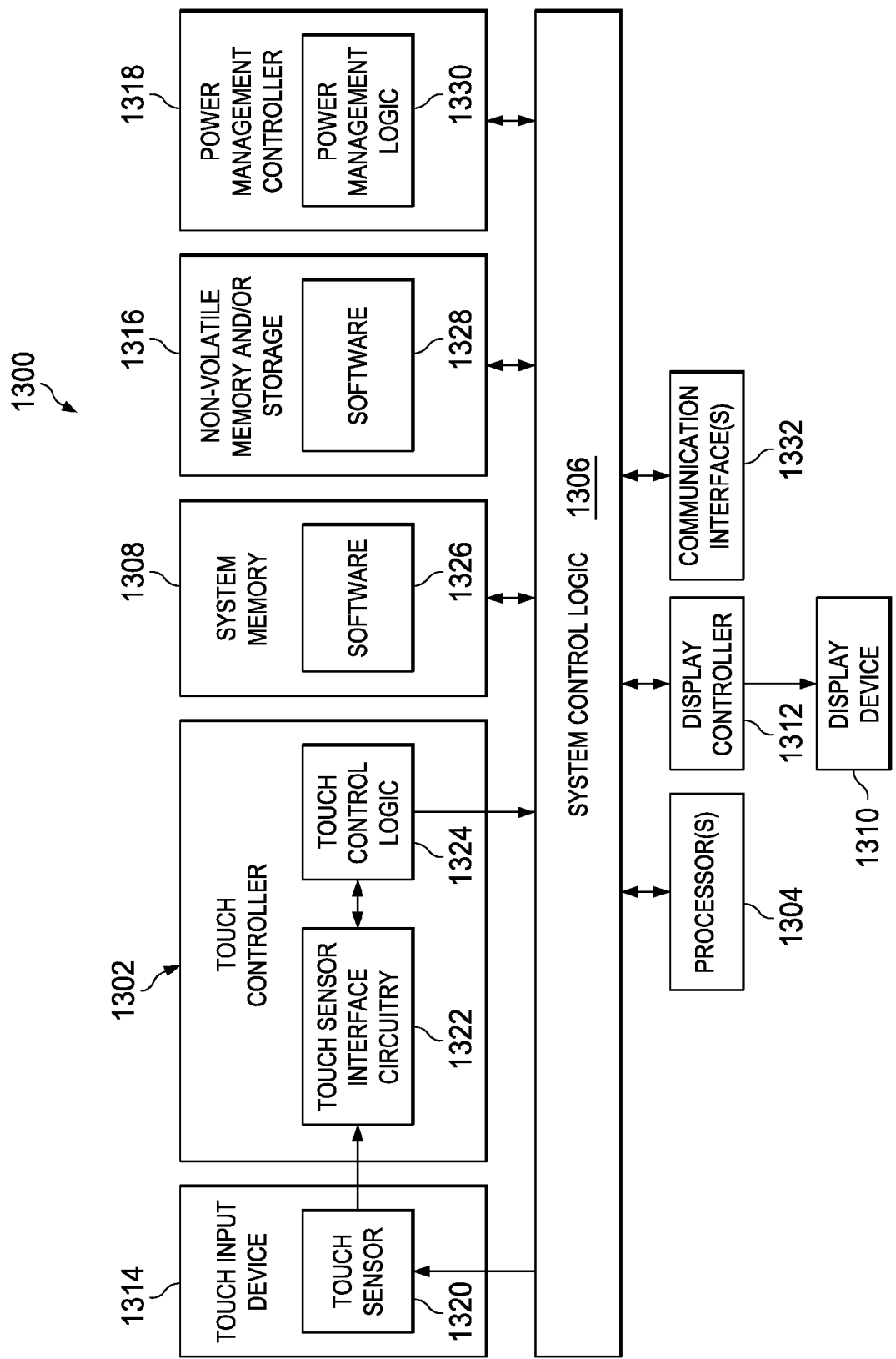
FIG. 13 is a simplified block diagram illustrating example logic that may be used to execute activities associated with the present disclosure.

FIG. 13 is a simplified block diagram illustrating a system 1300 comprising potential electronics and logic that may be associated with any of the menu management and navigation operations discussed herein. In at least one example embodiment, system 1300 includes a touch controller 1302, one or more processors 1304, system control logic 1306 coupled to at least one of processor(s) 1304, system memory 1308 coupled to system control logic 1306, non-volatile memory and/or storage device(s) 1316 coupled to system control logic 1306, display controller 1312 coupled to system control logic 1306, display controller 1312 coupled to a display device 1310, power management controller 1318 coupled to system control logic 1306, and/or communication interfaces 1332 coupled to system control logic 1306.

System control logic 1306, in at least one embodiment, includes any suitable interface controllers to provide for any suitable interface to at least one processor 1304 and/or to any suitable device or component in communication with system control logic 1306. System control logic 1306, in at least one embodiment, includes one or more memory controllers to provide an interface to system memory 1308. System memory 1308 may be used to load and store data and/or instructions, for example, for system 1300. System memory 1308, in at least one embodiment, includes any suitable volatile memory, such as dynamic random access memory (DRAM) for example. System control logic 1306, in at least one embodiment, includes one or more I/O controllers to provide an interface to display device 1310, touch controller 1302, and non-volatile memory and/or storage device(s) 1316.

Non-volatile memory and/or storage device(s) 1316 may be used to store data and/or instructions, for example within software 1328. Non-volatile memory and/or storage device(s) 1316 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1318 may include power management logic 1330 configured to control various power management and/or power saving functions. For example, in at least one embodiment, power management controller 1318 powers down the unused portion of the display and/or any backlight associated therewith.

Communications interface(s) 1332 may provide interfaces for system 1300 to communicate over one or more networks and/or with any other suitable device. Networks may include any one or more networks as previously described herein with reference to FIG. 12. Communications interface(s) 1332 may include any suitable hardware and/or firmware. Communications interface(s) 1332, in at least one example embodiment, may include, for example, a network adapter, a wireless network adapter, a telephone modem, and/or a wireless modem.

System control logic 1306, in at least one example embodiment, includes one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1304 may be packaged together with logic for one or more controllers of system control logic 1306. In at least one example embodiment, at least one processor 1304 may be packaged together with logic for one or more controllers of system control logic 1306 to form a System in Package (SiP). In at least one example embodiment, at least one processor 1304 may be integrated on the same die with logic for one or more controllers of system control logic 1306. For at least one example embodiment, at least one processor 1304 may be integrated on the same die with logic for one or more controllers of system control logic 1306 to form a System on Chip (SoC).

For touch control, touch controller 1302 may include touch sensor interface circuitry 1322 and touch control logic 1324. Touch sensor interface circuitry 1322 may be coupled to detect touch input over a first touch surface layer and a second touch surface layer of a display (i.e., display device 1310). Touch sensor interface circuitry 1322 may include any suitable circuitry that may depend, for example, at least in part on the touch-sensitive technology used for a touch input device. Touch sensor interface circuitry 1322, in one embodiment, may support any suitable multi-touch technology. Touch sensor interface circuitry 1322, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 1324 may be coupled to help control touch sensor interface circuitry 1322 in any suitable manner to detect touch input over a first touch surface layer and a second touch surface layer. Touch control logic 1324 for at least one example embodiment may also be coupled to output in any suitable manner digital touch input data corresponding to touch input detected by touch sensor interface circuitry 1322. Touch control logic 1324 may be implemented using any suitable logic, including any suitable hardware, firmware, and/or software logic (e.g., non-transitory tangible media), that may depend, for example, at least in part on the circuitry used for touch sensor interface circuitry 1322. Touch control logic 1324 for one embodiment may support any suitable multi-touch technology.

Touch control logic 1324 may be coupled to provide digital touch input data to system control logic 1306 and/or at least one processor 1304 for processing. At least one processor 1304 for one embodiment may execute any suitable software to process digital touch input data output from touch control logic 1324. Suitable software may include, for example, any suitable driver software and/or any suitable application software. As illustrated in FIG. 13, system memory 1308 may store suitable software 1326 and/or non-volatile memory and/or storage device(s).

Note that with the examples provided above, interaction may be described in terms of layers, protocols, interfaces, spaces, and environments more generally. This has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the embodiments discussed herein. Some of these blocks may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, application specifics, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense. Accordingly, the examples provided should not limit the scope or inhibit the broad techniques of communication system 10, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

OTHER NOTES AND EXAMPLES

The following examples pertain to further embodiments in accordance with this Specification.

Example C1 is at least one computer readable medium having instructions stored thereon for accessing applications through a user interface, the instructions when executed by one or more processors cause the one or more processors to: receive a request to display a rotatable menu of applications on a computing device; generate the rotatable menu comprising a first set of one or more content cards, at least one of the content cards of the first set representing at least one application in the computing device; and provide the rotatable menu in a first orientation for display on the computing device.

In Example C2, the subject matter of Example C1 can optionally include the instructions when executed by the one or more processors further causing the one or more processors to receive an indication of input to rotate the rotatable menu; rotate the rotatable menu to a second orientation; and cause, at least in part, actions that result in display of the rotatable menu in the second orientation.

In Example C3, the subject matter of Example C2 can optionally include the instructions when executed by the one or more processors further causing the one or more processors to receive the indication of input when a finger gesture is detected on a touch-sensitive screen of a display.

In Example C4, the subject matter of any one of Examples C1 through C3 can optionally include a content card of the first set being selectable by a user, where the content card changes as the rotatable menu is rotated.

In Example C5, the subject matter of Example C4 can optionally include the instructions when executed by the one or more processors further causing the one or more processors to: receive an indication of input to select the content card, the selected content card representing an application in the computing device; and cause, at least in part, actions that result in display of a zoomed-in view of the rotatable menu, where a first location in the zoomed-in view includes the selected content card with one or more graphical elements provided by the application.

In Example C6, the subject matter of Example C5 can optionally include the zoomed-in view including portions of two content cards of the first set in two other locations, the two other locations adjacent to opposite sides of the first location in the zoomed-in view.

In Example C7, the subject matter of any one of Examples C5 through C6 can optionally include the instructions when executed by the one or more processors further causing the one or more processors to: receive a second indication of input associated with an object of the application; generate a new rotatable menu comprising a second set of one or more content cards, at least one of the content cards in the second set representing another application in the computing device; and cause, at least in part, actions that result in display of the new rotatable menu.

In Example C8, the subject matter of Example C7 can optionally include the second indication of input being responsive to the object of the application being dragged to a menu control element in another location of the zoomed-in view.

In Example C9, the subject matter of any one of Examples C7 through C8 can optionally include the instructions when executed by the one or more processors further causing the one or more processors to identify the other application based, at least in part, on the application represented by the selected content card and on one or more context rules.

In Example C10, the subject matter of Example C9 can optionally include the identified other application being configured with a capability of performing an action on the object.

In Example C11, the subject matter of any one of Examples C5 through C10 can optionally include a third set of one or more content cards being layered behind the selected content card, where the selected content card and the one or more content cards of the third set contain one or more graphical elements provided by the application.

In Example C12, the subject matter of Example C11 can optionally include the instructions when executed by the one or more processors further causing the one or more processors to receive another indication of input to scroll through the one or more content cards of the third set.

In Example C13, the subject matter of any one of Examples C1 through C12 can optionally include one of the content cards of the first set being selectable when the rotatable menu is displayed in a first orientation, and where, when the rotatable menu is displayed in a second orientation, a different one of the content cards of the first set is selectable.

In Example C14, the subject matter of any one of Examples C1 through C12 can optionally include the rotatable menu being configured in a visual representation of a carousel.

In Example C15, the subject matter of any one of Examples C1 through C12 can optionally include one or more of the content cards of the first set each representing two or more applications.

In Example C16, the subject matter of Examples C15 can optionally include a selection of one of the content cards of the first set resulting in display of another rotatable menu including a fourth set of two or more other content cards representing two or more applications.

Example C17 is an apparatus for accessing applications through a user interface, the apparatus comprising: at least one processor; at least one memory comprising one or more applications; a menu manager module configured to: receive a request to display a rotatable menu of applications on the apparatus; generate the rotatable menu comprising a first set of one or more content cards, at least one of the content cards of the first set representing at least one application in the apparatus; and provide the rotatable menu in a first orientation for display on the apparatus.

In Example C18, the subject matter of Example C17 can optionally include the menu manager being further configured to: receive an indication of input to rotate the rotatable menu; rotate the rotatable menu to a second orientation; and cause, at least in part, actions that result in display of the rotatable menu in the second orientation.

In Example C19, the subject matter of Example C18 can optionally include the menu manager being further configured to receive the indication of input when a finger gesture is detected on a touch-sensitive screen of a display.

In Example C20, the subject matter of any one of Examples C17 through C19 can optionally include a content card of the first set being selectable by a user, where the content card changes as the rotatable menu is rotated.

In Example C21, the subject matter of Example C20 can optionally include the menu manager being further configured to: receive an indication of input to select the content card, the selected content card representing an application in the apparatus; and cause, at least in part, actions that result in display of a zoomed-in view of the rotatable menu, where a first location in the zoomed-in view includes the selected content card with one or more graphical elements provided by the application.

In Example C22, the subject matter of Example C21 can optionally include the zoomed-in view including portions of two content cards of the first set in two other locations, the two other locations adjacent to opposite sides of the first location in the zoomed-in view.

In Example C23, the subject matter of any one of Examples C21 through C22 can optionally include the menu manager being further configured to: receive a second indication of input associated with an object of the application; generate a new rotatable menu comprising a second set of one or more content cards, at least one of the content cards in the second set representing another application in the apparatus; and cause, at least in part, actions that result in display of the new rotatable menu.

In Example C24, the subject matter of Example C23 can optionally include the second indication of input being responsive to the object of the application being dragged to a menu control element in another location of the zoomed-in view.

In Example C25, the subject matter of any one of Examples C23 through C24 can optionally include the menu manager being further configured to identify the other application based, at least in part, on the application represented by the selected content card and on one or more context rules.

In Example C26, the subject matter of any one of Examples C23 through C25 can optionally include the identified other application being configured with a capability of performing an action on the object.

In Example C27, the subject matter of any one of Examples C21 through C26 can optionally include a third set of one or more content cards layered behind the selected content card, where the selected content card and the one or more content cards of the third set contain one or more graphical elements provided by the application In Example C28, the subject matter of Example C27 can optionally include the menu manager being further configured to receive another indication of input to scroll through the one or more content cards of the third set.

In Example C29, the subject matter of any one of Examples C17 through C28 can optionally include one of the content cards of the first set being selectable when the rotatable menu is displayed in a first orientation, and where, when the rotatable menu is displayed in a second orientation, a different one of the content cards of the first set is selectable.

In Example C30, the subject matter of any one of Examples C17 through C28 can optionally include the rotatable menu being configured in a visual representation of a carousel.

In Example C31, the subject matter of any one of Examples C17 through C28 can optionally include one or more of the content cards of the first set each representing two or more applications.

In Example C32, the subject matter of Example C31 can optionally include a selection of one of the content cards of the first set resulting in display of another rotatable menu including a fourth set of two or more other content cards representing two or more applications.

Example C33 is a method for accessing applications through a user interface, the method comprising: receiving a request to display a rotatable menu of applications on a computing device; generating the rotatable menu comprising a first set of one or more content cards, at least one of the content cards of the first set representing at least one application in the computing device; and providing the rotatable menu in a first orientation for display on the computing device.

In Example C34, the subject matter of Example C33 can optionally include receiving an indication of input to rotate the rotatable menu; rotating the rotatable menu to a second orientation; and causing, at least in part, actions that result in display of the rotatable menu in the second orientation.

In Example C35, the subject matter of any one of Examples C33 through C34 can optionally include receiving the indication of input when a finger gesture is detected on a touch-sensitive screen of a display.

In Example C36, the subject matter of any one of Examples C33 through C35 can optionally include a content card of the first set being selectable by a user, where the content card changes as the rotatable menu is rotated.

In Example C37, the subject matter of Example C36 can optionally include receiving an indication of input to select the content card, the selected content card representing an application in the computing device; and causing, at least in part, actions that result in display in a zoomed-in view of the rotatable menu, where a first location of the zoomed-in view includes the selected content card with one or more graphical elements provided by the application.

In Example C38, the subject matter of Example C37 can optionally include the zoomed-in view including portions of two content cards of the first set in two other locations, the two other locations adjacent to opposite sides of the first location in the zoomed-in view.

In Example C39, the subject matter of any one of Examples C37 through C38 can optionally include receiving a second indication of input associated with an object of the application; generating a new rotatable menu comprising a second set of one or more content cards, at least one of the content cards in the second set representing another application in the computing device; and causing, at least in part, actions that result in display of the new rotatable menu.

In Example C40, the subject matter of Example C39 can optionally include the second indication of input being responsive to the object of the application being dragged to a menu control element in another location of the zoomed-in view.

In Example C41, the subject matter of any one of Examples C39 through C40 can optionally include identifying the other application based, at least in part, on the application represented by the selected content card and on one or more context rules.

In Example C42, the subject matter of any one of Examples C39 through C41 can optionally include the identified other application being configured with a capability of performing an action on the object.

In Example C43, the subject matter of any one of Examples C37 through C42 can optionally include a third set of one or more content cards layered behind the selected content card, where the selected content card and the one or more content cards of the third set contain one or more graphical elements provided by the application.

In Example C44, the subject matter of Example C43 can optionally include receiving another indication of input to scroll through the one or more content cards of the third set.

In Example C45, the subject matter of any one of Examples C33 through C44 can optionally include one of the content cards of the first set being selectable when the rotatable menu is displayed in a first orientation, and where, when the rotatable menu is displayed in a second orientation, a different one of the content cards of the first set is selectable.

In Example C46, the subject matter of any one of Examples C33 through C44 can optionally include the rotatable menu being configured in a visual representation of a carousel.

In Example C47, the subject matter of one of Examples C33 through C44 can optionally include one or more of the content cards of the first set each representing two or more applications.

In Example C48, the subject matter of Example C47 can optionally include a selection of one of the content cards of the first set resulting in display of another rotatable menu including a fourth set of two or more other content cards representing two or more applications.

Example C49 is an apparatus for accessing applications through a user interface, comprising: means for receiving a request to display a rotatable menu of applications on a computing device; means for generating the rotatable menu comprising a first set of one or more content cards, at least one of the content cards representing at least one application in the computing device; and means for providing the rotatable menu in a first orientation for display on the computing device.

Example C50 is an apparatus comprising means for performing the method of any one of Examples C33-48.

In Example C51, the subject matter of Example C50 can optionally include the means for performing the method comprising at least one processor and at least one memory.

In Example C52, the subject matter of any one of Examples C49 through C51 can optionally include the apparatus being a computing device.

In Example C53, the subject matter of Example C51 can optionally include the memory comprising machine-readable instructions, that when executed cause the apparatus to perform the method of any one of Examples C33-48.

Example C54 is at least one computer readable medium comprising instructions that, when executed, implement a method or realize an apparatus as described in any one of the preceding Examples C1-C54.

Example S1 includes at least one computer readable medium having instructions stored thereon for accessing applications through a user interface, the instructions when executed by one or more processors cause the one or more processors to: receive an indication of input to request a menu of applications on a computing device; generate the menu comprising a first set of one or more display elements, at least one display element in the first set representing at least one application in the computing device; and cause, at least in part, actions that result in a modification of a top layer view in a display to reveal, at least in part, a lower layer view in the display, where the top layer view includes one or more graphical elements provided by a foreground application, and where the lower layer view includes the menu.

In Example S2, the subject matter of Example S1 can optionally include the instructions when executed by the one or more processors further causing the one or more processors to identify the at least one application based, at least in part, on one or more context rules associated with the foreground application.

In Example S3, the subject matter of any one of Examples S1 through S2 can optionally include the instructions when executed by the one or more processors further causing the one or more processors to receive the indication of input when a finger gesture is detected on a touch-sensitive screen of the display.

In Example S4, the subject matter of any one of Examples S1 through S3 can optionally include a display element in the first set being selectable by a user.

In Example S5, the subject matter of any one of Examples S1 through S4 can optionally include the instructions when executed by the one or more processors further causing the one or more processors to: receive another indication of input to select one of the display elements, the selected one of the display elements representing an application in the computing device; and cause, at least in part, actions that result in display of a new top layer view including one or more graphical elements provided by the application.

In Example S6, the subject matter of any one of Examples S1 through S4 can optionally include the instructions when executed by the one or more processors further causing the one or more processors to: receive another indication of input to request a new menu of applications; generate the new menu comprising a second set of one or more display elements, at least one display element of the second set representing at least one other application in the computing device; and cause, at least in part, actions that result in a modification of the lower layer view in the display to reveal, at least in part, a lowest layer view in the display, where the lowest layer view includes the new menu.

In Example S7, the subject matter of Example S6 can optionally include the second set of display elements representing more applications in the computing device than the first set of display elements.

In Example S8, the subject matter of any one of Examples S6 through S7 can optionally include the displayed new menu being scrollable.

In Example S9, the subject matter of any one of Examples S1 through S55 can optionally include the indication of input being associated with an object of the foreground application.

In Example S10, the subject matter of Example S9 can optionally include the indication of input being received when the object of the foreground application is dragged to a side edge of the display.

In Example S11, the subject matter of any one of Examples S9 through S10 can optionally include the at least one application represented by the at least one display element of the first set being configured with a capability of performing an action on the object.

In Example S12, the subject matter of any one of Examples S1 through S11 can optionally include the instructions when executed by the one or more processors further causing the one or more processors to cause, at least in part, actions that result in pausing the foreground application when the indication of input is received.

Example S13 is an apparatus for accessing applications on a graphical user interface, comprising: at least one processor; at least one memory; a menu manager module configured to: receive an indication of input to request a menu of applications on an apparatus; generate the menu comprising a first set of one or more display elements, at least one display element in the first set representing at least one application in the apparatus; and cause, at least in part, actions that result in a modification of a top layer view in a display to reveal, at least in part, a lower layer view in the display, where the top layer view includes one or more graphical elements provided by a foreground application, and where the lower layer view includes the menu.

In Example S14, the subject matter of Example S13 can optionally include the menu manager being further configured to identify the at least one application based, at least in part, on one or more context rules associated with the foreground application.

In Example S15, the subject matter of any one of Examples S13 through S14 can optionally include the menu manager being further configured to receive the indication of input when a finger gesture is detected on a touch-sensitive screen of the display.

In Example S16, the subject matter of any one of Examples S13 through S15 can optionally include a display element in the first set being selectable by a user.

In Example S17, the subject matter of any one of Examples S13 through S16 can optionally include the menu manager being further configured to: receive another indication of input to select one of the display elements, the selected one of the display elements representing an application in the apparatus; and cause, at least in part, actions that result in display of a new top layer view including one or more graphical elements provided by the application.

In Example S18, the subject matter of any one of Examples S13 through S16 can optionally include the menu manager being further configured to: receive another indication of input to request a new menu of applications; generate the new menu comprising a second set of one or more display elements, at least one display element of the second set representing at least one other application in the apparatus; and cause, at least in part, actions that result in a modification of the lower layer view in the display to reveal, at least in part, a lowest layer view in the display, where the lowest layer view includes the new menu.

In Example S19, the subject matter of Example S18 can optionally include the second set of display elements representing more applications in the apparatus than the first set of display elements.

In Example S20, the subject matter of any one of Examples S18 through S19 can optionally include the displayed new menu being scrollable.

In Example S21, the subject matter of any one of Examples S13 through S17 can optionally include the indication of input being associated with an object of the foreground application.

In Example S22, the subject matter of Example S21 can optionally include the indication of input being received when the object of the foreground application is dragged to a side edge of the display.

In Example S23, the subject matter of any one of Examples S21 through S22 can optionally include the at least one application represented by the at least one display element of the first set being configured with a capability of performing an action on the object.

In Example S24, the subject matter of any one of Examples S13 through S23 can optionally include the menu manager being further configured to cause, at least in part, actions that result in pausing the foreground application when the indication of input is received.

Example S25 is a method for accessing applications on a graphical user interface, the method comprising: receiving an indication of input to request a menu of applications on a computing device; generating the menu comprising a first set of one or more display elements, at least one display element in the first set representing at least one application in the computing device; and causing, at least in part, actions that result in a modification of a top layer view in a display to reveal, at least in part, a lower layer view in the display, where the top layer view includes one or more graphical elements provided by a foreground application, and where the lower layer view includes the menu.

In Example S26, the subject matter of Example S25 can optionally include identifying the at least one application based, at least in part, on one or more context rules associated with the foreground application.

In Example S27, the subject matter of any one of Examples S25 through S26 can optionally include receiving the indication of input when a finger gesture is detected on a touch-sensitive screen of the display.

In Example S28, the subject matter of any one of Examples S25 through S27 can optionally include a display element in the first set being selectable by a user.

In Example S29, the subject matter of any one of Examples S25 through S28 can optionally include: receiving another indication of input to select one of the display elements, the selected one of the display elements representing an application in the computing device; and causing, at least in part, actions that result in display of a new top layer view including one or more graphical elements provided by the application.

In Example S30, the subject matter of any one of Examples S25 through S28 can optionally include: receiving another indication of input to request a new menu of applications; generating the new menu comprising a second set of one or more display elements, at least one display element of the second set representing at least one other application in the computing device; and causing, at least in part, actions that result in a modification of the lower layer view in the display to reveal, at least in part, a lowest layer view in the display, where the lowest layer view includes the new menu.

In Example S31, the subject matter of Example S30 can optionally include the second set of display elements representing more applications in the computing device than the first set of display elements.

In Example S32, the subject matter of any one of Examples S30 through S31 can optionally include the displayed new menu being scrollable.

In Example S33, the subject matter of any one of Examples S25 through S29 can optionally include the indication of input being associated with an object of the foreground application.

In Example S34, the subject matter of Example S33 can optionally include the indication of input being received when the object of the foreground application is dragged to a side edge of the display.

In Example S35, the subject matter of any one of Examples S33 through S34 can optionally include the at least one application represented by the at least one display element of the first set being configured with a capability of performing an action on the object.

In Example S36, the subject matter of any one of Examples S25 through S35 can optionally include causing, at least in part, actions that result in pausing the foreground application when the indication of input is received.

Example S37 is an apparatus for accessing applications through a user interface, comprising: means for receiving an indication of input to request a menu of applications on a computing device; means for generating the menu comprising a first set of one or more display elements, at least one display element in the first set representing at least one application in the computing device; and means causing, at least in part, actions that result in a modification of a top layer view in a display to reveal, at least in part, a lower layer view in the display, where the top layer view includes one or more graphical elements provided by a foreground application, and where the lower layer view includes the menu.

Example S38 is an apparatus comprising means for performing the method of any one of Examples S25-S36.

In Example S39, the subject matter of Example S38 can optionally include the means for performing the method comprising at least one processor and at least one memory.

In Example S40, the subject matter of any one of Examples S13-S24 and S38-S39 can optionally include the apparatus being a computing device.

In Example S41, the subject matter of Example S39 can optionally include the memory comprising machine-readable instructions, that when executed cause the apparatus to perform the method of any one of Examples S25-S36.

Example S42 is at least one computer readable medium comprising instructions that, when executed, implement a method or realize an apparatus as described in any one of the preceding Examples S1-S41.

What is claimed is:

1. At least one non-transitory computer readable medium comprising instructions stored thereon for accessing applications through a user interface, the instructions when executed by one or more hardware processors cause the one or more hardware processors to:
   generate a rotatable menu of applications on a computing device, the rotatable menu comprising a first set of content cards in a three-dimensional view of a carousel configuration, a first content card of the first set of content cards representing an application that is open in the computing device and a second content card of the first set of content cards representing a content card folder associated with two or more applications:
   provide the rotatable menu in a first orientation for display on the computing device;
   receive a first indication of input to select the second content card;
   generate a second rotatable menu comprising a second set of content cards in another three-dimensional view of a carousel configuration, the second set of content cards representing the two or more applications associated with the content card folder; and
   provide the second rotatable menu for display on the computing device;
   receive a second indication of input to select the first content card;
   after receiving the second indication of input, cause, at least in part, actions that result in display of a zoomed-in view of the rotatable menu, wherein a first location in the zoomed-in view includes the selected first content card with one or more graphical elements generated during execution by the open application, wherein second and third locations in the zoomed-in view are adjacent to opposite sides of the first location, the second location including a portion of one content card of the first set of content cards, the third location including a portion of another content card of the first set of content cards;
   receive a third indication of input indicating an object of the open application was dragged to a menu control element in a fourth location of the zoomed-in view; and
   after receiving the third indication of input, generate a new rotatable menu including a third set of content cards in a third three-dimensional view of a carousel configuration, the third set of content cards contextually relevant to the open application and representing at least two applications that can perform actions associated with the object.

2. The non-transitory computer readable medium of claim 1, wherein the instructions when executed by the one or more processors further cause the one or more hardware processors to:
- receive a fourth indication of input to rotate the rotatable menu;
- rotate the rotatable menu to a second orientation; and
- cause, at least in part, actions that result in display of the rotatable menu in the second orientation, wherein in the second orientation of the rotatable menu, the first content card is defined in a rear location of the rotatable menu and one or more graphical elements associated with the first content card are not visible in the first content card on the display.

3. The non-transitory computer readable medium of claim 2, wherein the instructions when executed by the one or more processors further cause the one or more hardware processors to:
- receive the fourth indication of input when a finger gesture is detected on a touch-sensitive screen of a display.

4. The non-transitory computer readable medium of claim 1, wherein the first content card of the first set is selectable by a user if the first content card is defined in a selectable location in the rotatable menu displayed on the computing device, wherein the first content card of the first set is not selectable by the user if rotation of the rotatable menu causes the first content card to be defined in a different location that is not selectable in the rotatable menu displayed on the computer device.

5. The non-transitory computer readable medium of claim 1, wherein the instructions when executed by the one or more processors further cause the one or more hardware processors to:
- cause, at least in part, actions that result in display of the new rotatable menu.

6. The non-transitory computer readable medium of claim 5, wherein the instructions when executed by the one or more processors further cause the one or more hardware processors to:
- identify the at least two other applications for the new rotatable menu based, at least in part, on the application represented by the selected content card and on one or more context rules.

7. The non-transitory computer readable medium of claim 1, wherein a fourth set of one or more content cards are layered behind the selected first content card, wherein the selected first content card and the one or more content cards of the fourth set contain one or more graphical elements provided by the open application.

8. The non-transitory computer readable medium of claim 7, wherein the instructions when executed by the one or more processors further cause the one or more hardware processors to:
- receive another indication of input to scroll through the one or more content cards of the fourth set.

9. The non-transitory computer readable medium of claim 1, wherein one of the content cards of the first set is selectable when the rotatable menu is displayed in a first orientation, and wherein, when the rotatable menu is displayed in a second orientation, a different one of the content cards of the first set is selectable.

10. The non-transitory computer readable medium of claim 1, wherein the content cards of the first rotatable menu are provided in a contextual order based on relevance of the applications represented by the content cards to each other.

11. An apparatus for accessing applications through a user interface, comprising:
- at least one hardware processor;
- at least one memory storing one or more applications; and
- a menu manager module, when executed by the at least one hardware processor, is to:
  - generate a rotatable menu of applications on a computing device, the rotatable menu comprising a first set of content cards in a three-dimensional view of a carousel configuration, a first content card of the first set of content cards representing an application that is open in the computing device and a second content card of the first set of content cards representing a content card folder associated with two or more applications;
  - provide the rotatable menu in a first orientation to be displayed on the computing device;
  - receive a first indication of input to select the second content card;
  - generate a second rotatable menu comprising a second set of content cards in another three-dimensional view of a carousel configuration, the second set of content cards representing the two or more applications associated with the content card folder;
  - provide the second rotatable menu for display on the computing device;
  - receive a second indication of input to select the first content card;
  - after receiving the second indication of input, cause, at least in part, actions that result in display of a zoomed-in view of the rotatable menu, wherein a first location in the zoomed-in view includes the selected first content card with one or more graphical elements generated during execution by the open application, wherein second and third locations in the zoomed-in view are adjacent to opposite sides of the first location, the second location including a portion of one content card of the first set of content cards, the third location including a portion of another content card of the first set of content cards;
  - receive a third indication of input indicating an object of the open application was dragged to a menu control element in a fourth location of the zoomed-in view; and
  - after receiving the third indication of input, generate a new rotatable menu including a third set of content cards in a third three-dimensional view of a carousel configuration, the third set of content cards contextually relevant to the open application and representing at least two applications that can perform actions associated with the object.

12. The apparatus of claim 11, wherein the menu manager, when executed by the at least one hardware processor, is to:
- receive an fourth indication of input to rotate the rotatable menu;
- rotate the rotatable menu to a second orientation; and
- cause, at least in part, actions that result in display of the rotatable menu in the second orientation, wherein, in the second orientation of the rotatable menu, the first content card is defined in a rear location of the rotatable menu and one or more graphical elements associated with the first content card are not visible in the first content card on the display.

13. The apparatus of claim 11, wherein the first content card of the first set is selectable by a user if the first content card is defined in a selectable location in the rotatable menu displayed on the computing device, wherein the first content card of the first set is not selectable by the user if rotation of the rotatable menu causes the first content card to be defined in a different location that is not selectable in the rotatable menu displayed on the computing device.

14. The apparatus of claim 11, wherein the menu manager, when executed by the at least one hardware processor, is to:
cause, at least in part, actions that result in display of the new rotatable menu.

15. The apparatus of claim 14, wherein the menu manager, when executed by the at least one hardware processor, is to:
identify the at least two other applications for the new rotatable menu based, at least in part, on the application represented by the selected first content card and on one or more context rules.

16. The apparatus of claim 11, wherein the content cards of the first rotatable menu are provided in a contextual order based on relevance of the applications represented by the content cards to each other.

17. A method for accessing applications through a user interface, the method comprising:
generating a rotatable menu of applications on a computing device, the rotatable menu comprising a first set of content cards in a three-dimensional view of a carousel configuration, a first content card of the first set of content cards representing an application that is open in the computing device and a second content card of the first set of content cards representing a content card folder associated with two or more applications;
providing the rotatable menu in a first orientation for display on the computing device,
receiving a first indication of input to select the second content card;
generating a second rotatable menu comprising a second set of content cards in another three-dimensional view of a carousel configuration, the second set of content cards representing the two or more applications associated with the content card folder;
providing the second rotatable menu for display on the computing device;
receiving a second indication of input to select the first content card;
after receiving the second indication of input, causing, at least in part, actions that result in display of a zoomed-in view of the rotatable menu, wherein a first location in the zoomed-in view includes the selected first content card with one or more graphical elements generated during execution by the open application, wherein second and third locations in the zoomed-in view are adjacent to opposite sides of the first location, the second location including a portion of one content card of the first set of content cards, the third location including a portion of another content card of the first set of content cards;
receive a third indication of input indicating an object of the open application was dragged to a menu control element in a fourth location of the zoomed-in view; and
after receiving the third indication of input, generating a new rotatable menu including a third set of content cards in a third three-dimensional view of a carousel configuration, the third set of content cards contextually relevant to the open application and representing at least two applications that can perform actions associated with the object.

18. The method of claim 17, further comprising:
receiving a fourth indication of input to rotate the rotatable menu;
rotating the rotatable menu to a second orientation; and
causing, at least in part, actions that result in display of the rotatable menu in the second orientation.

19. The method of claim 17, wherein the content cards of the first rotatable menu are provided in a contextual order based on relevance of the applications represented by the content cards to each other.

* * * * *

UNITED STATES PATENT AND TRADEMARK OFFICE
CERTIFICATE OF CORRECTION

PATENT NO.       : 9,448,694 B2
APPLICATION NO.  : 13/886115
DATED            : September 20, 2016
INVENTOR(S)      : Sameer Sharma et al.

It is certified that error appears in the above-identified patent and that said Letters Patent is hereby corrected as shown below:

In the claims

In Column 32, line 32, in Claim 1, delete "applications:" and insert -- applications; --, therefor.

In Column 33, line 9, in Claim 2, delete "wherein" and insert -- wherein, --, therefor.

In Column 33, line 31, in Claim 4, delete "computer" and insert -- computing --, therefor.

In Column 33, line 44, in Claim 6, after "selected" insert -- first --.

In Column 33, line 60, in Claim 9, delete "a" and insert -- the --, therefor.

In Column 34, line 54, in Claim 12, delete "an" and insert -- a --, therefor.

Signed and Sealed this
Twentieth Day of December, 2016

Michelle K. Lee
*Director of the United States Patent and Trademark Office*